United States Patent
Yamakaji et al.

(10) Patent No.: US 12,118,774 B2
(45) Date of Patent: Oct. 15, 2024

(54) INFORMATION PROCESSING DEVICE

(71) Applicant: Mitsubishi Electric Corporation, Tokyo (JP)

(72) Inventors: Yusuke Yamakaji, Tokyo (JP); Kunihiko Fukushima, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 18/563,401

(22) PCT Filed: May 31, 2021

(86) PCT No.: PCT/JP2021/020708
§ 371 (c)(1),
(2) Date: Nov. 22, 2023

(87) PCT Pub. No.: WO2022/254528
PCT Pub. Date: Dec. 8, 2022

(65) Prior Publication Data
US 2024/0273890 A1     Aug. 15, 2024

(51) Int. Cl.
*G06V 10/82*     (2022.01)
*G06V 10/774*    (2022.01)

(52) U.S. Cl.
CPC ............ *G06V 10/82* (2022.01); *G06V 10/774* (2022.01)

(58) Field of Classification Search
None
See application file for complete search history.

(56) References Cited

U.S. PATENT DOCUMENTS

| | | | |
|---|---|---|---|
| 2008/0008376 A1* | 1/2008 | Andel | G06V 10/22 382/141 |
| 2015/0319821 A1 | 11/2015 | Yoshida | |
| 2016/0378301 A1 | 12/2016 | Hirakawa | |
| 2020/0019827 A1 | 1/2020 | Howard et al. | |

FOREIGN PATENT DOCUMENTS

| | | |
|---|---|---|
| JP | 2016-162250 A | 9/2016 |
| JP | 2018-092453 A | 6/2018 |
| JP | 2018-124639 A | 8/2018 |

(Continued)

OTHER PUBLICATIONS

International Search Report and Written Opinion mailed on Jul. 13, 2021, received for PCT Application PCT/JP2021/020708, filed on May 31, 2021, 9 pages including English Translation.

(Continued)

*Primary Examiner* — Leon Flores
(74) *Attorney, Agent, or Firm* — XSENSUS LLP

(57) ABSTRACT

An information processing device processes image data representing a distribution of at least one numerical data in a specific space. The information processing device includes a storage unit and an inference unit. The storage unit stores an image recognition program. The inference unit extracts specific information about the at least one numerical data from the image data by executing the image recognition program. A symbol having an appearance corresponding to each of the at least one numerical data is disposed at a position associated with the numerical data in the specific space.

19 Claims, 30 Drawing Sheets

(56) References Cited

FOREIGN PATENT DOCUMENTS

JP       2018-200695 A       12/2018

OTHER PUBLICATIONS

Udrescu et al., "AI Feynman: A physics-inspired method for symbolic regression", Science Advances, Computer Science, Udrescu and Tegmark, Sci. Adv., eaay2631, vol. 6, Apr. 15, 2020, pp. 1-16.
Endo et al., "Feature Extraction from GPS Logs Using Representation Learning for Transportation Mode Estimation", IPSJ Transactions on Databases, vol. 8, No. 3, Sep. 2015, pp. 12-23 (12 pages including English Abstract).
Notice of Reasons for Refusal mailed on Feb. 1, 2022, received for JP Application 2021-563348, 7 pages including English Translation.
Decision to Grant mailed on Apr. 5, 2022, received for JP Application 2021-563348, 6 pages including English Translation.
Extended European Search Report issued Apr. 5, 2024 in corresponding European Patent Application No. 21944036.9, 10 pages.
Gee-Sern Hsu, et al., "Multivariate dice recognition using invariant features", Optical Engineering, vol. 52, No. 4, Apr. 22, 2013, XP93144866.
Mathieu Cliche, et al., "Scatteract: Automated extraction of data from scatter plots", Bloomberg LP, Apr. 21, 2017, XP080764665.

\* cited by examiner

INFORMATION PROCESSING DEVICE

CROSS-REFERENCE TO RELATED APPLICATION

This application is based on PCT filing PCT/JP2021/020708, filed May 31, 2021, the entire contents of which are incorporated herein by reference.

TECHNICAL FIELD

The present disclosure relates to an information processing device that performs processing regarding image data.

BACKGROUND ART

Conventionally, an information processing device that performs processing regarding the image data is known. For example, Japanese Patent Laying-Open No. 2018-92453 (PTL 1) discloses a training device that generates training data by assigning a teacher label to the image data generated by integrating pixel information based on numerical values of a plurality of pieces of sensor data, and generates a training model by machine learning for the training data. According to the training device, a plurality of numerical data can be collectively converted into a format that is easy to analyze, and the plurality of numerical data can be trained at one time by machine learning.

CITATION LIST

Patent Literature

PTL 1: Japanese Patent Laying-Open No. 2018-92453

SUMMARY OF INVENTION

Technical Problem

The plurality of sensors disclosed in PTL 1 are disposed at various positions. Relevance between each of the plurality of pieces of sensor data respectively acquired by the plurality of sensors and the position of the sensor corresponding to the sensor data can be a characteristic unique to the training data generated from the plurality of pieces of sensor data. However, PTL 1 does not consider reflecting position information about the plurality of sensors in the training data.

The present disclosure has been made to solve the above-described problems, and an object of the present disclosure is to easily implement the reflection of the relevance between numerical data and the position information in processing for the image data by an information processing device that performs the processing.

Solution to Problem

An information processing device according to an aspect of the present disclosure processes image data representing a distribution of at least one numerical data in a specific space. The information processing device includes a storage unit and an inference unit. The storage unit stores an image recognition program. The inference unit extracts specific information about the at least one numerical data from the image data by executing the image recognition program. A symbol having an appearance corresponding to each of at least one numerical data is disposed at a position with which the numerical data is associated in the specific space.

An information processing device according to another aspect of the present disclosure processes image data representing a distribution of at least one numerical data in a specific space. The information processing device includes a storage unit and a training unit. The storage unit stores an image recognition model that extracts specific information regarding at least one numerical data from the image data. The training unit makes the image recognition model a trained model. A symbol having an appearance corresponding to each of at least one numerical data is disposed at a position with which the numerical data is associated in the specific space.

Advantageous Effects of Invention

According to the information processing device of the present disclosure, because the symbol having the appearance corresponding to each of at least one numerical data is disposed at the position with which the numerical data is associated in the specific space, reflection of relevance between the numerical data and the position information in the processing for the image data can be easily implemented by the information processing device that performs the processing.

DESCRIPTION OF EMBODIMENTS

Figure 1:
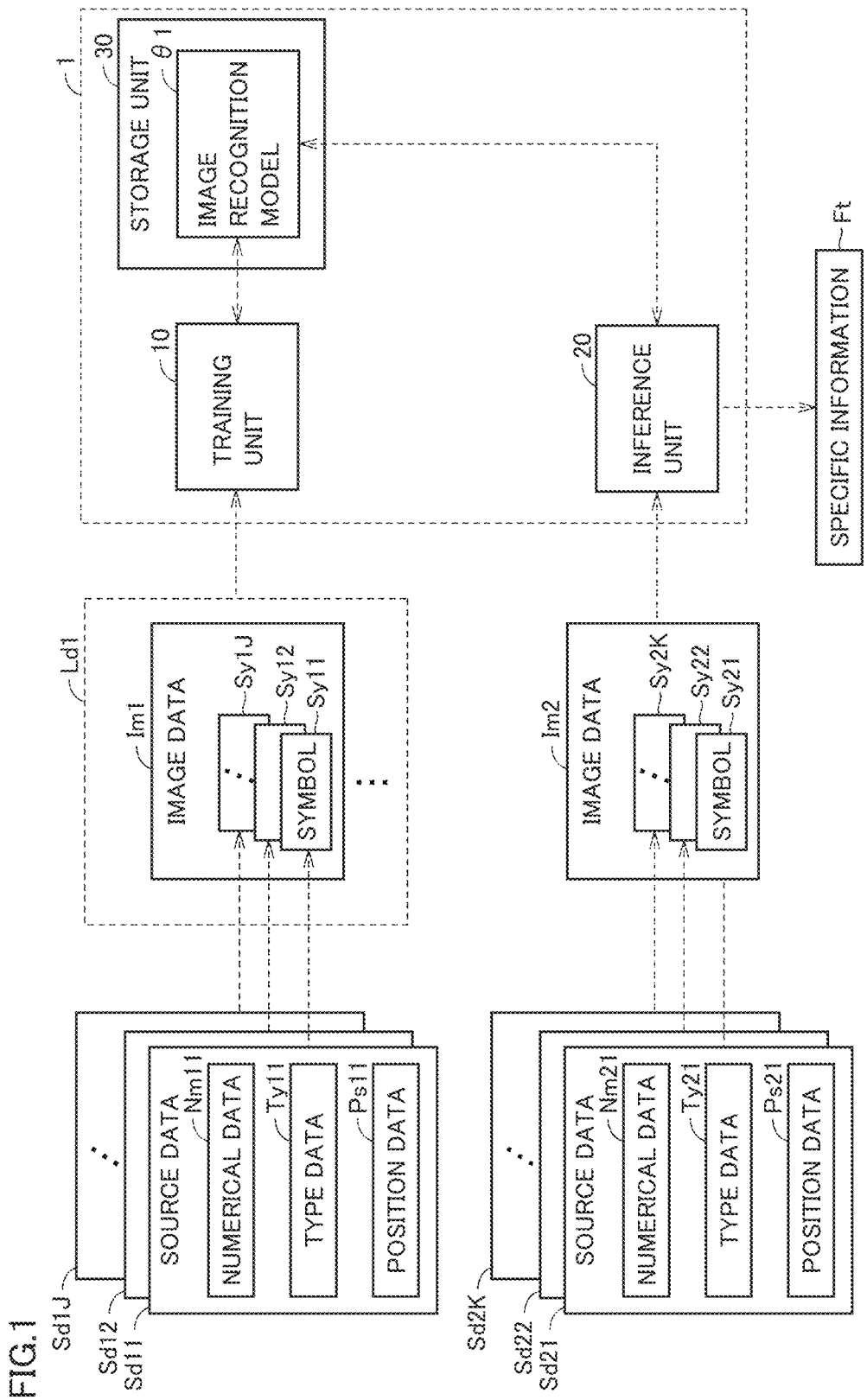
FIG. 1 is a block diagram illustrating a functional configuration of an information processing device according to a first embodiment.

With reference to the drawings, embodiments of the present disclosure will be described in detail below. In the drawings, the same or corresponding part is denoted by the same reference numeral, and the description thereof will not generally be repeated.

First Embodiment

FIG. 1 is a block diagram illustrating a functional configuration of an information processing device 1 according to a first embodiment. As illustrated in FIG. 1, information processing device 1 includes a training unit 10, an inference unit 20, and a storage unit 30. Storage unit 30 stores an image recognition model $\theta1$. Image data is input to information processing device 1. FIG. 1 illustrates image data Im1, Im2 as an example of the image data. Image data Im1 is input to training unit 10, and image data Im2 is input to inference unit 20.

Training unit 10 makes image recognition model $\theta1$ a trained model by machine learning using training data Ld1 including image data Im1. Image data Im1 includes a plurality of symbols Sy11 to Sy1J (J is a natural number greater than or equal to 2) respectively corresponding to a plurality of source data Sd11 to Sd1J. Source data Sd1$j$ ($j$ is a natural number greater than or equal to 1 and less than or equal to J) includes numerical data Nm1$j$, type data Ty1$j$, and position data Ps1$j$. Appearance of symbol Sy1$j$ is determined by numerical data Nm1$j$ and type data Ty1$j$. A position of symbol Sy1$j$ in image data Im1 is determined by position data Ps1$j$ associated with numerical data Nm1$j$ in source data Sd1$j$. Image data Im1 expresses distribution of the plurality of numerical data Nm11 to Nm1J in the specific space. The number of the plurality of source data corresponding to the image data included in training data Ld1 is not limited to natural number J.

Image recognition model $\theta1$ extracts specific information characterized by a plurality of source data from image data corresponding to the plurality of source data that are similar to image data Im1. Specifically, for example, image recognition model $\theta1$ includes a convolutional neural network (CNN), a multi-layer perceptron (MLP), a recurrent neural network (RNN), a model having an attention mechanism, a neural network such as a vision transformer (ViT) that is an application of the attention, a graph neural network (GNN), and a graph convolutional neural network (GCN) that is an application of the GNN, a gradient boosting decision tree (GBDT), or a support vector classification (SVC) machine. For example, the convolutional neural network includes a residual network (ResNet), a very deep convolutional network (VGGNet), or an EfficientNet.

For example, training unit 10 performs a machine learning algorithm such as deep learning for CNN, MLP, or RNN or a gradient boosting method for a gradient boosting decision tree on image recognition model $\theta1$. However, training unit 10 may perform preprocessing for reading information about the symbol included in each of the plurality of image data included in training data Ld1 before performing the training processing, preprocessing for extracting the contour line of the symbol, or preprocessing for removing a noise constituent that becomes an error factor. Training unit 10 may change the training processing according to the result of the preprocessing. For example, when image recognition model $\theta1$ includes the CNN, a size of the filter of the CNN may be changed according to the size of the symbol included in training data Ld1. The size of a typical CNN filter is often 3×3, 5×5, or the like. However, in the case where the CNN has an M (M is a natural number) layer in a channel direction, a 1×1×M filter is also used. As for the filter size, information in a wide area in the image can be read as the size increases, such as 7×7 or 9×9, but the calculation amount exponentially increases depending on the filter size. Therefore, it is common to extract the feature amount of the wide area in the image by increasing the total number of hidden layers while reducing the filter size. The size of the CNN filter included in image recognition model θ1 is desirably greater than or equal to the size of the symbol. However, the calculation amount of the training processing rapidly increases when the CNN filter becomes large, so that the filter smaller than the size of the symbol may be used in the CNN of image recognition model θ1 when at least three hidden layers can be provided. This is because, as approaching an output layer of the CNN, an effect of blurring the image data is generated by providing an activation function in each of the hidden layers, and as a result, the same effect as in the case where the size of the CNN filter is relatively large can be implemented. In addition, because details of the image data can be analyzed using a relatively small filter, the CNN is desirably multilayered using the small filter when a calculation resource can be secured.

When the training processing performed by training unit 10 is supervised learning, correct answer data associated as a correct answer with the image data included in training data Ld1 may be any data. For example, when the image data including, as the symbol, temperature and humidity measured by a temperature and humidity sensor in an indoor space (specific space) is input data of image recognition model θ1, and an index of user comfort in the indoor space is output data of image recognition model θ1, the image data included in training data Ld1 corresponds to a distribution of numerical data measured by the temperature and humidity sensor. The image data includes the symbol disposed at a position in the indoor space of the temperature and humidity sensor. The correct data associated with the image data is an index value. At least 100 combinations (teacher data) of the image data and the correct data are required, and preferably at least 10,000 combinations are prepared. The space (specific space) represented in the image data included in training data Ld1 is not required to be a two-dimensional space, but may be at least a three-dimensional space. However, when semi-supervised learning is performed as the training processing, the correct data is at least better than the image data. Furthermore, in the case of unsupervised learning in which clustering such as self-supervised learning is performed as the training processing, only the image data may be used. At least 100 data are desirably prepared in each of the semi-supervised learning and the unsupervised learning in which the clustering is performed.

For example, the image data included in training data Ld1 may be image data in which the symbol corresponding to the numerical data is disposed at the position in the factory of a wireless instrument with the disposition, reception sensitivity, and a transmission output of the wireless instrument in the factory as the numerical data. In this case, the data inferred from the image data by image recognition model θ1 may be wireless environment data at a specific position in the factory. Furthermore, when the image data including the numerical data corresponding to each of a plurality of integrated circuits (ICs) on a printed board or circuit components as the symbol is input to image recognition model θ1, the output of the ICs when the ICs are implemented on the printed board, or a target value of a signal amount propagated as a signal transmitted to the outside of the printed board or a signal transmitted through space may be used as the correct data.

Image data Im2 includes a plurality of symbols Sy21 to Sy2K respectively corresponding to a plurality of source data Sd21 to Sd2K (K is a natural number greater than or equal to 2). Source data Sd2$k$ (k is a natural number greater than or equal to 1 and less than or equal to K) includes numerical data Nm2$k$, type data Ty2$k$, and position data Ps2$k$. The appearance of symbol Sy2$k$ is determined by numerical data Nm2$k$ and type data Ty2$k$ of source data Sd2$k$. The position of symbol Sy2$k$ in image data Im2 is determined by position data Ps2$k$ associated with numerical data Nm2$k$ in source data Sd2$k$. Image data Im2 expresses the distribution of the plurality of numerical data Nm21 to Nm2K in the specific space.

Inference unit 20 extracts specific information Ft characterized by the plurality of source data Sd21 to Sd2M from image data Im2 using trained image recognition model θ1, and outputs specific information Ft. For example, inference unit 20 may output specific information Ft to an input and output unit (not illustrated in FIG. 1) of information processing device 1. The number of the plurality of source data corresponding to the image data input to inference unit 20 is not limited to a natural number K.

Figure 2:
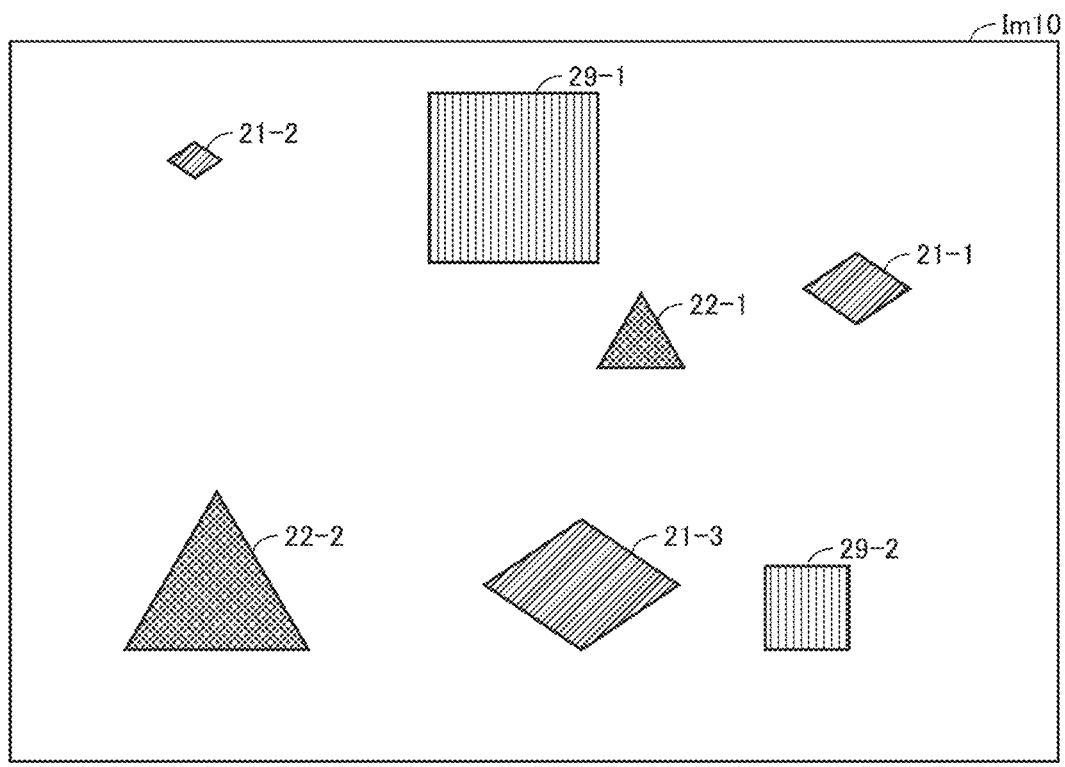
FIG. 2 is a view illustrating image data that is an example of image data processed by the information processing device in FIG. 1.

FIG. 2 is a view illustrating image data Im10 that is an example of the image data processed by information processing device 1 in FIG. 1. As illustrated in FIG. 2, image data Im10 includes symbols 21-1, 21-2, 21-3, 22-1, 22-2, 29-1, 29-2.

The shape of the appearance of each of symbols 21-1 to 21-3 is a rhombus. Symbols 21-1 to 21-3 are different from each other in an appearance size. Symbols 21-1 to 21-3 have the same appearance color or pattern. The shape of the appearance of each of symbols 22-1, 22-2 is a triangle. Symbols 22-1, 22-2 are different from each other in the appearance size. Symbols 22-1, 22-2 have the same appearance color or pattern. Symbols 21-1, 22-1, 23-1 are different from each other in terms of the color or pattern of the appearance. The shape of the appearance of each of symbols 29-1, 29-2 is a quadrangle. Symbols 29-1, 29-2 are different from each other in the appearance size. Symbols 29-1, 29-2 have the same appearance color or pattern.

The shape of the appearance of the symbol may be a shape other than a quadrangle, a rhombus, and a triangle (for example, a polygon, a circle, or an ellipse). In addition, one triangle of two similar triangles may be rotated with respect to a center of gravity of the triangle to be the symbol different from the other triangle. The rectangle may be made a symbol different from the other rectangle by changing a ratio between a long side and a short side of one of two similar rectangles.

Each of symbols 21-1 to 21-3, 22-1, 22-2, 29-1, 29-2 represents the numerical data related to an object disposed in an N-dimensional (N is a natural number greater than or equal to 2) space. In FIG. 2, as an example, each symbol represents the numerical data (for example, a resistance value, an inductance value of a coil, or a capacitance value of a capacitor) related to the object (for example, a circuit component implemented on the printed board) disposed in the two-dimensional space. For example, the symbol included in the image data input to information processing device 1 in FIG. 1 may represent the numerical data related to the object (a temperature sensor or a humidity sensor disposed in an air-conditioned space) disposed in an at least three-dimensional space.

Figure 3:
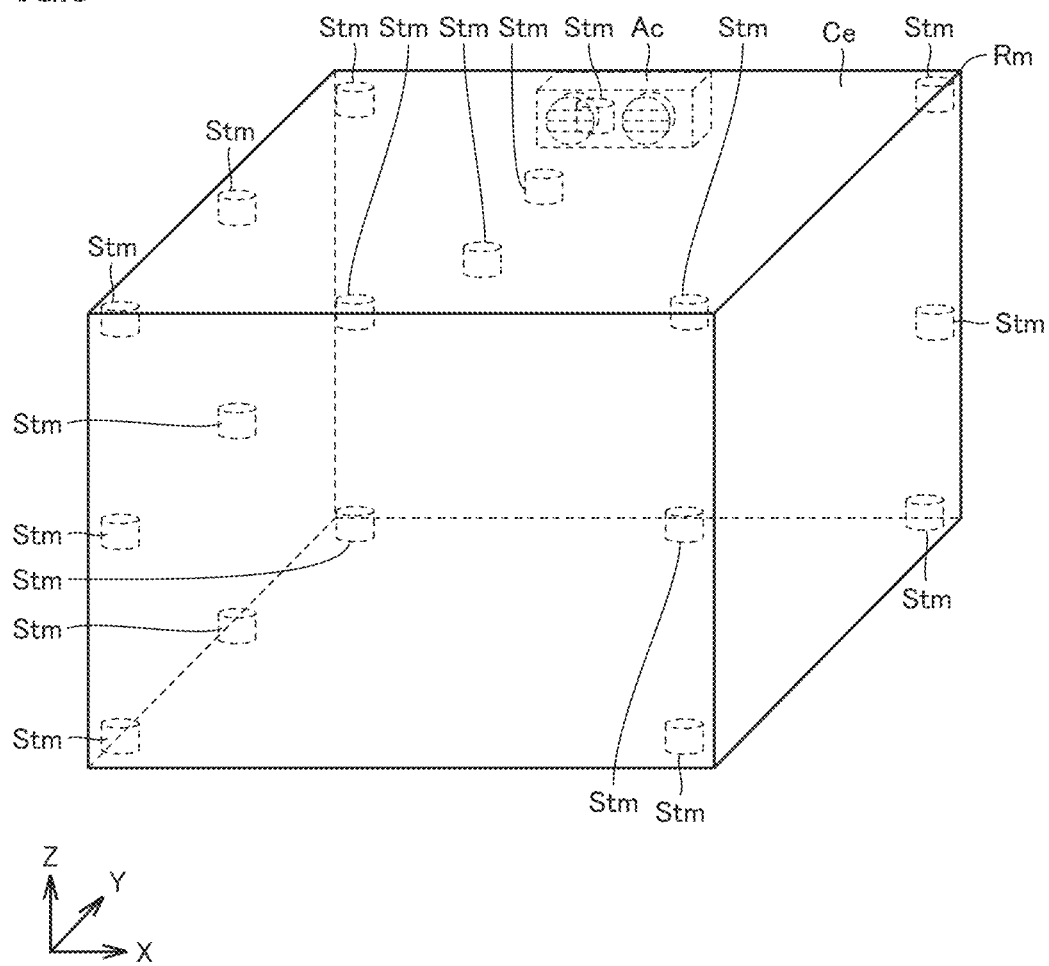
FIG. 3 is a view illustrating an air-conditioned space that is a three-dimensional space in which an air conditioner and a plurality of temperature sensors are disposed.

FIG. 3 is a view illustrating an air-conditioned space Rm that is the three-dimensional space in which an air conditioner Ac and a plurality of temperature sensors Stm are disposed. For example, when two different temperature sensors Stm are disposed respectively at a center of a ceiling Ce and a corner of the ceiling Ce in air-conditioned space Rm, the symbol corresponding to the temperature (numerical data) measured by temperature sensor Stm disposed at the center of ceiling Ce and the symbol corresponding to the temperature (numerical data) measured by temperature sensor Stm disposed at the corner of ceiling Ce are disposed respectively at the position of the center of ceiling Ce and the position of the corner of ceiling Ce in the image data of air-conditioned space Rm. The space represented by image data input to information processing device 1 in FIG. 1 may be any space as long as a coordinate in the space is defined, and for example, may be a two-dimensional or multi-dimensional virtual space not having a physical space such as a network space or a virtual design space on computer-aided design (CAD). Furthermore, physical temperature sensor Stm is not necessarily disposed in air-conditioned space Rm, but the instrument that measures the state of a remote object in a non-contact manner, such as an infrared sensor or an infrared camera, may be disposed in air-conditioned space Rm. Furthermore, information equivalent to that of temperature sensor Stm may be obtained by combining the device and a device such as a Doppler lidar that checks a flow of an airflow in a depth direction.

A type of numerical data represented by the symbol is represented by the appearance of the symbol in which patterns, shapes, colors, dots, or the like included in the symbol are combined. For example, the pattern of the symbol is expressed as a pattern in which gradation, circles, dots, or the like are combined. For example, the shape of the symbol is expressed as a circle, an ellipse, or a polygon. The color of the symbol is represented by, for example, three primary colors of red, green, and blue, and a color chart (RGB color model) in which the three primary colors are combined.

The symbol included in the image data input to information processing device 1 may be a symbol in which a plurality of dots are combined. For example, the appearance of the symbol in which the plurality of dots are combined has a lattice shape or a shape obtained by dividing a rectangle under a predetermined condition. The symbol has a plurality of regions, and the color or the pattern is inserted into each of the plurality of regions.

The plurality of symbols in FIG. 2 are different from each other in appearance. Consequently, in the training processing and the inference processing in information processing device 1, image recognition model θ1 can easily distinguish between a certain symbol and another symbol. In addition to a representation form of the symbol in FIG. 2, the representation in colors or dots can be also combined. The symbol may be expressed in any form as long as the symbol is a combination of the above-described expression forms.

Figure 4:
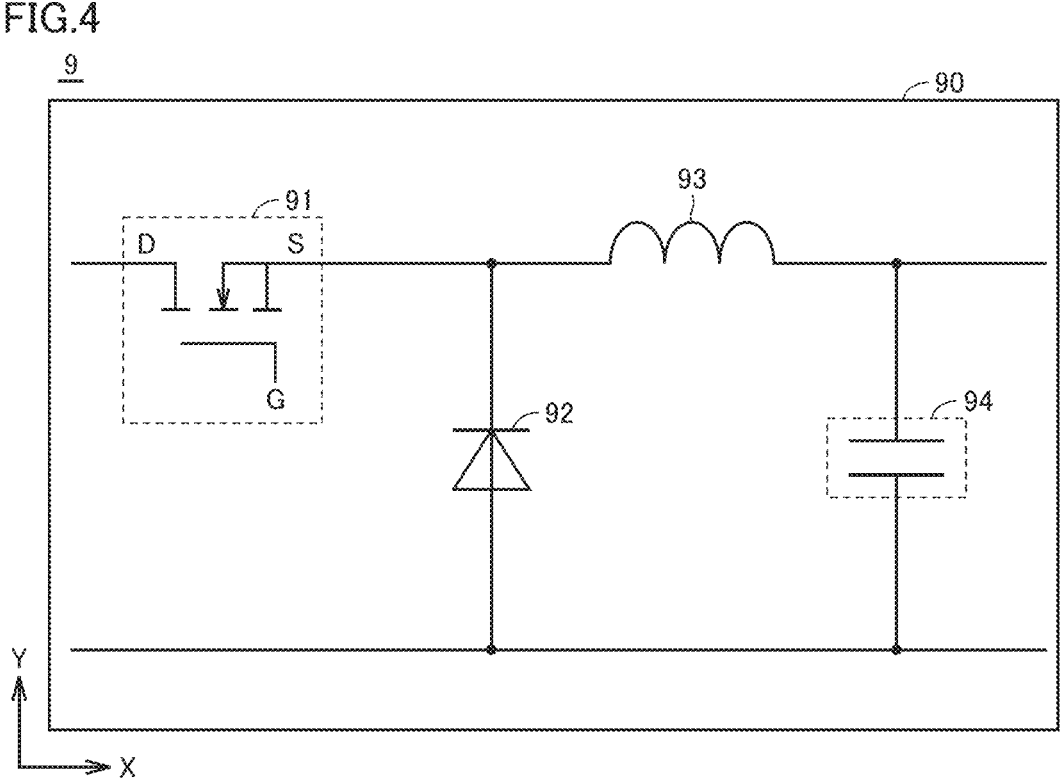
FIG. 4 is a view illustrating a circuit configuration of a step-down chopper circuit that is an example of a circuit configured on a printed board.
Figure 5:
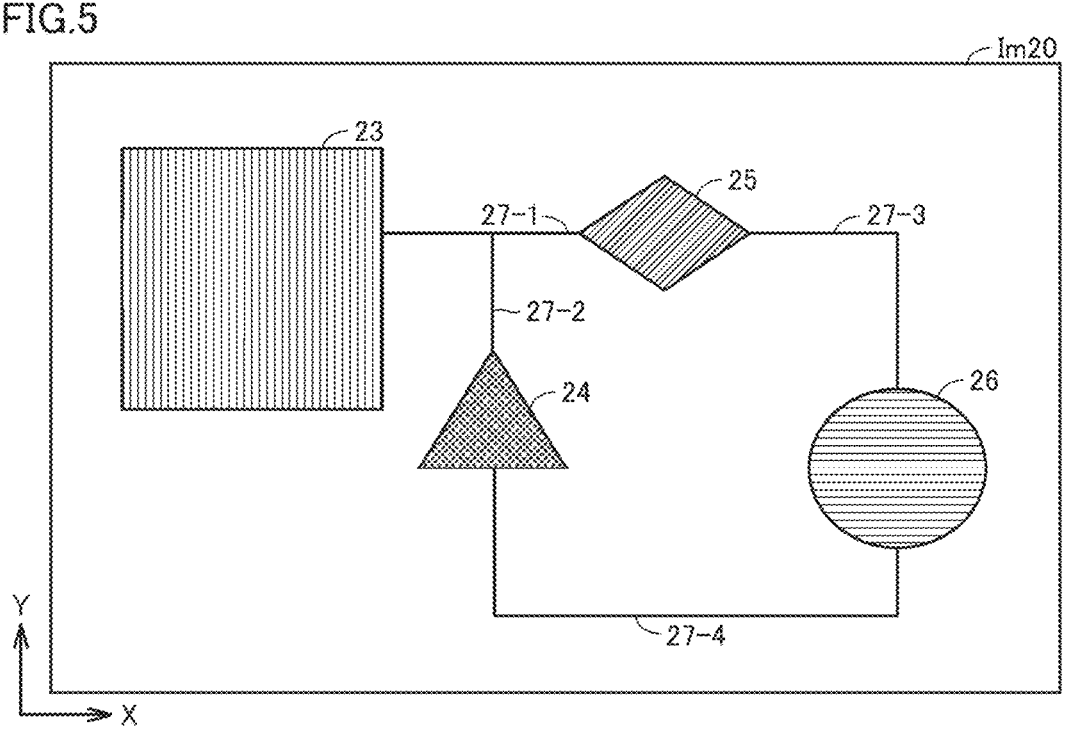
FIG. 5 is a view illustrating image data as an example of image data corresponding to the step-down chopper circuit in FIG. 4.
Figure 6:
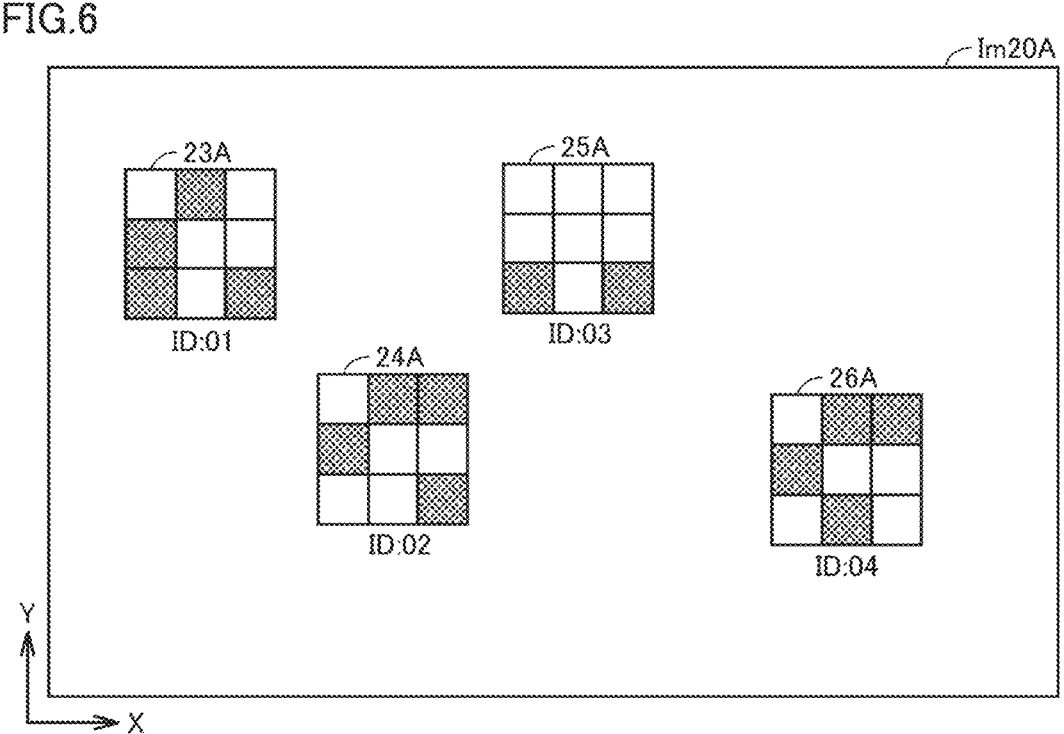
FIG. 6 is a view illustrating image data as another example of the image data corresponding to the step-down chopper circuit in FIG. 4.

With reference to FIGS. 4, 5, and 6, the case where the image data expresses a distribution of the numerical data related to a circuit component implemented on the printed board will be described as a further specific example of the image data input to information processing device 1 in FIG. 1.

FIG. 4 is a view illustrating a circuit configuration of a step-down chopper circuit 9 that is an example of a circuit configured on the printed board. In FIG. 4, an X-axis and a Y-axis are orthogonal to each other. As illustrated in FIG. 4, step-down chopper circuit 9 includes a printed board 90, a power semiconductor 91 including a metal-oxide-semiconductor field effect transistor (MOSFET), a diode 92, an inductor 93, and a capacitor 94. Each of power semiconductor 91, diode 92, inductor 93, and capacitor 94 is a circuit component implemented on printed board 90. Power semiconductor 91 includes a source (S), a drain (D), and a gate (G). Source (S) of power semiconductor 91 is connected to a cathode of diode 92 and one end of inductor 93. The other end of inductor 93 is connected to one electrode of capacitor 94. An anode of diode 92 is connected to the other electrode of capacitor 94. Drain (D) of power semiconductor 91 and the anode of diode 92 are connected to a power supply (not illustrated). The other end of inductor 93 and the other electrode of capacitor 94 are connected to a load (not illustrated) or a different power supply circuit. Each of power semiconductor 91, diode 92, inductor 93, and capacitor 94 is associated with a coordinate of a two-dimensional plane defined on printed board 90. For example, the coordinate of each of power semiconductor 91, diode 92, inductor 93, and capacitor 94 is the coordinate of the center of gravity of the region occupied by the circuit component on printed board 90 or the coordinate of any point included in the region. Numerical data, the type, and the coordinate (position information) of each of power semiconductor 91, diode 92, inductor 93, and capacitor 94 correspond to one source data in FIG. 1.

FIG. 5 is a view illustrating image data Im20 as an example of the image data corresponding to step-down chopper circuit 9 in FIG. 4. As illustrated in FIG. 5, image data Im20 includes symbols 23, 24, 25, 26. Symbols 23 to 26 correspond respectively to the numerical data of power semiconductor 91, the numerical data of diode 92, the numerical data of inductor 93, and the numerical data of capacitor 94. Unlike image data Im10 in FIG. 2, image data Im20 also includes wirings 27-1, 27-2, 27-3, 27-4 that connect the symbols. Wiring 27-1 connects symbol 23 and symbol 25. Wiring 27-2 connects symbols 23 and 24. Wiring 27-3 connects symbols 25 and 26. Wiring 27-4 connects symbols 24 and 26. Examples of the correct data corresponding to image data Im20 include a physical feature, such as a waveform or amplitude, of the output signal obtained from step-down chopper circuit 9, the output of electromagnetic noise from printed board 90 regarding electromagnetic compatibility (EMC), a frequency feature of the electromagnetic noise, an input voltage of the electromagnetic noise mixed into printed board 90 from the outside of step-down chopper circuit 9, and an EMC feature including the frequency feature of the electromagnetic noise.

When the number of types of circuit components implemented on printed board 90 is greater than or equal to 10, it may be difficult to distinguish the types of circuit components only by the shape of the symbol. Generally, the number of types of circuit components implemented on the printed board can be greater than or equal to 100 using a combination of a passive component and an active component. In such a case, the symbol corresponding to the numerical data of the circuit component of which many types are assumed by the combination of the plurality of dots can be expressed. For example, when the symbol is the plurality of dots of 3×3 and when each of the plurality of dots represents binary information (1 bit), assuming that the orientation of the symbol is constant, the symbol can represent 516 ($=2^9$) types. When the symbol is the plurality of dots of 4×4, the direction of the symbol is constant, namely, 65536 ($=2^{16}$) types can be expressed. The shape of the appearance of the symbol that is the combination of the plurality of dots is not required to be a square, but may be any shape such as a trapezoid or a rectangle. The shape may be any shape as long as the shape is the combination of a plurality of dots drawn in a closed region. One dot is not required to be one pixel, but may be the combination of a plurality of pixels. The plurality of dots may include at least two dots having different colors from each other. All pieces of information about the object corresponding to the symbol are not required to be represented by the symbol. An identifier (ID: identification) may be associated with the symbol to describe the identifier in the symbol. Furthermore, each dot is not required to be either a white dot or a black dot, but may have a color of gray or a color other than gray. However, when a color other than black and white is used, the number of CNN layers is increased, so that desirably the color other than black and white and an intermediate color of the black and white is not used for a dot that can be expressed only by the contrast of black and white. When the information is provided to each dot as described above, the amount of information included in the symbol having the same dimension can be increased, so that the symbol can be disposed at a pinpoint position of a specific object.

FIG. 6 is a view illustrating image data Im20A as another example of the image data corresponding to step-down chopper circuit 9 in FIG. 4. As illustrated in FIG. 6, image data Im20A includes symbols 23A, 24A, 25A, 26A. Symbols 23A to 26A correspond respectively to the numerical data of power semiconductor 91, the numerical data of diode 92, the numerical data of inductor 93, and the numerical data of capacitor 94. Each of symbols 23A to 26A includes 3×3 dots. Identifiers ID01 to ID04 are described respectively in symbols 23A to 26A, respectively. As illustrated in the following Table 1, a type of a component, a component feature, and the like are previously associated with each of identifiers ID01 to ID04.

TABLE 1

| ID | Component type | Component feature | ... |
|----|----------------|-------------------|-----|
| 01 | Power semiconductor | Manufacturer: company A Model Number: B | ... |
| 02 | Diode | Manufacturer: company C Model Number: D | ... |
| 03 | Coil | Manufacturer: company E Model Number: F | ... |
| 04 | Capacitor | Manufacturer: company G Model Number: H | ... |

Although the numerical data used for design using electromagnetism has been mainly described above, the image data input to information processing device 1 in FIG. 1 may include numerical data regarding a physical phenomenon different from the electromagnetism, such as fluid design, thermal design, or stress design. In addition, the image data may include the numerical data regarding a plurality of physical phenomena in which electromagnetism and thermodynamics are combined. For example, the result of the temporal change in the electromagnetic electric signal and the result of the temporal change in the temperature rise of thermodynamics may be associated with the image data as the correct data. When the deep learning is used as the training processing, the same image data is input to an input layer of the CNN, data propagation is branched in the hidden layer, and an appropriate logistic function such as a softmax function is selected according to the classification problem or the regression problem, whereby the output of image recognition model θ1 corresponding to a plurality of different physical quantities can be implemented. Furthermore, the numerical data corresponding to the symbol may be data unrelated to the physical phenomenon. Two different numerical data depend on each other, and the two numerical data may not be in an orthogonal relationship.

For example, types of numerical data corresponding to the symbols may include the temperature measured by the temperature sensor, the humidity measured by the humidity sensor, a capacitance value of a capacitor, or an inductance of a coil. The plurality of numerical data corresponding respectively to the plurality of symbols included in certain image data are not required to be the same type from the viewpoint of circuit components such as the capacitance value of the capacitor and the inductance of the coil, but may be any numerical data as long as the numerical data can define position information in the specific space. In addition, even for the same capacitor, different types of capacitors may be identified by adapting a multilayer ceramic capacitor, a film capacitor, an aluminum electrolytic capacitor, and the like with the plurality of different symbols. Furthermore, even in the same coil, different types of coils may be identified by adapting a normal mode choke coil, a common mode choke coil, a hybrid choke coil, a transformer, and the like with the plurality of different symbols, respectively.

Magnitude (amplitude) of the numerical data represents relative magnitude of the numerical data associated with the same type of object (for example, sensor). For example, the relative size is expressed by a combination image of a plurality of dots including pieces of information about the size of the symbol itself, the color configuring the symbol, and the relative size. For the color of the symbol, for example, transparency may be designated in addition to designation of a color by an RGB color model. For example, the transparency of the symbol corresponding to the numerical data may be set to be high (thin) when the numerical data measured by the sensor is relatively small in relation to another sensor of the same type, and the transparency may be set to be relatively low (dark) when the numerical data is relatively large.

The size of the symbol is the size of the symbol expressed in the image data. For example, the symbol corresponding to the numerical data is expressed relatively small when the numerical data measured by a certain sensor is relatively small in relation to another sensor of the same type, and the symbol is expressed relatively large when the numerical data is relatively large.

A relative transparency ratio or a magnitude ratio in the relationship between the symbol corresponding to the numerical data and the symbol corresponding to another numerical data is not required to be proportional or inversely proportional to the ratio between the numerical data and another numerical data. For example, the relative transparency ratio or the magnitude ratio may be a value proportional to a value obtained by inputting the ratio between the numerical data and another numerical data to a function of an arbitrary combination such as a logarithm, an index, or a periodic function. For example, a common logarithm function having a base of 10 can be used as the function.

A ratio between a capacitance value of 1 u ($10^{-6}$) F of a certain capacitor and a capacitance value of 1 p ($10^{-12}$) F of another capacitor is 106 times (=$10^{-6}/10^{-12}$). In a case where the numerical data of 1 pF is represented by a symbol of 3 pixels in the image data, and the size of the symbol of the numerical data is set to be proportional to the ratio of the two numerical data, the number of pixels required to represent the symbol of the numerical data of 1 uF is 3×106, and thus, it is practically impossible to include the symbol in the image data. On the other hand, a value obtained by inputting the ratio to the common logarithm function is six times. When 1 pF is expressed by 3 pixels in the image data using the common logarithm function, 1 uF can be expressed by 18 (=3×6) pixels in the image data. Consequently, both the symbol corresponding to 1 pF and the symbol corresponding to 1 uF can be included in the image data of the same printed board. Furthermore, in the symbol in which the plurality of dots are combined, the size of the symbol can be expressed by the plurality of dots. In addition, the symbol represented by the combination of the plurality of dots and the identifier may be associated with each other, and a relative size may be represented by comparison with two IDs associated respectively with the two symbols. However, when the logarithms are used in this way, it is often difficult to find a highly accurate design value. For example, there is little difference between 9 pF and 10 pF, and it can also be difficult to identify 10 pF and 100 pF in some cases. However, when an approximate value can be calculated, the optimization problem can be solved with the approximate value close to the solution as the initial value. When the initial value is close to the solution, the optimization problem can be solved in a short time by a general optimization method (for example, a steepest descent method or a Newton method).

In the image data including at least one symbol, desirably the shape or position information of the changing symbol is excluded, and the same or a change that can be generated at timing of the inference processing is input to training unit 10 as the change in the image data in the training processing at timing of the training processing and timing of the inference processing. For this reason, the image data included in training data Ld1 is preferably still image data. Furthermore, for the image data that does not affect the desired feature desired to be implemented in information processing device 1, even when the image data is the image data that changes according to a lapse of time, such as moving image data, desirably an unnecessary portion is removed from the image data in the preprocessing of the training processing, or the training processing is performed using the training data in which the change in the image data is assumed. As described above, a technique for embedding the symbol having numerical information or ID information in the image data is defined as numerical symbol embedding.

In addition, as an example of the numerical image embedding, even in the case where the plurality of image data are related to each other like the printed board in which components are implemented on both surfaces of the printed board, the plurality of image data are integrally input to information processing device 1, and the image data of each layer is convolved in the direction between layers (channel direction), whereby the relationship between the symbols of the plurality of image data can be trained and inferred. The processing for convolving the direction of the layer (spatial direction) and the direction between the layers at the same time may be performed, or depthwise convolution only in a spatial direction and pointwise convolution only in the channel direction may be sequentially performed like MobileNet. For example, according to information processing device 1, information characterized by a constituent of spatial coupling such as magnetic coupling or electric field coupling between a component implemented on the surface and a component implemented on a back surface of the printed board can be extracted from the plurality of image data.

When the physical dimension of the object (target) regarding the numerical data in the image data is relatively large and when the object occupies most of the space represented in the image data, the symbol corresponding to the numerical data in the image data may be disposed at the center of the target or at a uniquely determined specific position. For example, when a power conversion reactor disposed on the printed board occupies almost half the area of the printed board, the symbol corresponding to the numerical data of the reactor may be disposed at a specific position in the reactor in the image data corresponding to the printed board.

On the other hand, when the physical dimension of the target is relatively small, the center of the symbol corresponding to the target numerical data may be disposed at the center of the target or at a predetermined specific position. For example, when the target is the coil, the numerical data corresponding to the coil may be disposed at the center of gravity or the like of the coil. When the numerical data is embedded in the image data in this manner, the information processing device capable of considering the physical feature that is difficult to express by an equivalent circuit such as magnetic coupling between the coils or stray capacitance can be constructed.

When the plurality of numerical data are associated with one position, the plurality of image data corresponding respectively to the plurality of numerical data may be prepared, and the plurality of symbols corresponding respectively to the plurality of numerical data may be disposed at the same positions of the plurality of image data. For example, in the case of the temperature and humidity sensor in which the temperature sensor and the humidity sensor are integrated as another example of numerical image embedding, the symbol corresponding to the temperature (numerical data) measured by the temperature and humidity sensor may be disposed at the position of certain image data in which the temperature and humidity sensor is disposed, and the symbol corresponding to the humidity (numerical data) measured by the temperature and humidity sensor may be disposed at the position of another image data in which the temperature and humidity sensor is disposed. However, when the number of the plurality of numerical data associated with one position is relatively small, the plurality of symbols may be arranged side by side in one piece of image data. For example, two symbols corresponding respectively to the temperature and the humidity measured by the temperature and humidity sensor may be arranged side by side without changing their relative positions.

The type of symbol may be expressed by a combination of colors according to an RGB color model in addition to shapes such as a rhombus, a circle, a trapezoid, and a polygon, and patterns such as a direction of hatching (pattern). Furthermore, for the shape of the appearance of the symbol, the rotated symbol may be distinguished from the symbol before the rotation by rotating the symbol with respect to the center or the center of gravity at the position of the symbol.

However, the number of symbols that can be expressed by the above combination is limited. When the type and number of symbols are relatively small, the characteristics included in the plurality of source data are sufficiently reflected in the image data, so that the characteristic included in the source data can be recognized with high accuracy by trained image recognition model θ1. However, when the number of the plurality of symbols included in the image data increases, the difference in appearance between the plurality of symbols becomes relatively small, and it may be difficult to classify the plurality of symbols. For example, in the case of generating the image data regarding 20 sensors or circuit components different from each other, because the number of usable symbols is limited, when two symbols similar in appearance to each other, such as a pentagonal symbol and a hexagonal symbol, are used, the difference in appearance between the two symbols is reduced. In such the case, desirably the symbol and a symbol in which the plurality of dots are combined are combined for one piece of numerical data, or the plurality of dots are combined to configure a symbol corresponding to one piece of numerical data. Furthermore, the shape of the symbol configured by a combination of a plurality of dots is not required to be a quadrangle, but the shape may be any shape such as a polygon or an ellipse. Furthermore, the background color of the symbol is not required to be white, but may be any color as long as the background color is a single color.

The size of the numerical data corresponding to the symbol can be expressed by the dimension of the symbol, a shade of the color of the symbol, and the combination thereof. As described above, the size of the numerical data corresponding to the symbol can also be expressed by the combination of the plurality of dots. The dimension of the symbol may be any value as long as the value is calculated using a true number, a logarithm, or a certain function. The shade of the color of the symbol is also similar to the size of the symbol. The shade of the color of the symbol may be expressed in grayscale, or may be expressed by changing the ratio of RGB in the color image data. When the shade of the color of the symbol is expressed by RGB and when image recognition model θ1 includes a convolutional neural network, the image data is divided into three in the channel direction of the input of the CNN, and the convolution arithmetic operation for each channel is performed at a stage subsequent to the input layer, so that the shade for each channel can be expressed similarly to the shade in grayscale. Furthermore, the size of the symbol may be expressed by the size of the symbol by expressing the type of symbol by the combination of the plurality of dots, the size of the symbol may be expressed by the combination of the plurality of dots by expressing the type of symbol by the shape, or the type and the shape of the symbol may be expressed by the combination of the plurality of dots. However, when the above-described printed boards on both sides are input, or when information in which the plurality of sensor data are disposed at the same position is input to different layers (separately in the channel direction), the information is increased in the same channel direction as RGB, so that there is a possibility that image recognition model θ1 cannot be correctly trained. Consequently, for example, when RGB color information is used for the double-sided printed board, desirably the double-sided printed board is expressed by each of R, G, and B, or the double-sided printed board is expressed by the combination of symbol types, shapes, or dots without using color information.

In the conventional information processing device, when the numerical data having a meaning in a spatial position or orientation is processed as described above, an information processing device that puts a position coordinate into the numerical data or processes the numerical data, another information processing device that processes the image, and another information processing device that combines the two information processing devices are required. However, it is difficult to individually train each of these three information processing devices. On the other hand, in the first embodiment, the symbol corresponding to the numerical data is disposed in the image data at the spatial absolute position or the relative position of the object regarding the numerical data, so that the position information such as the coordinate and the numerical data can be included in the image data. According to the information processing device of the first embodiment, the image data having complex information such as the numerical data (for example, physical property value) and the position information about the object regarding the numerical data can be input to one information processing device. According to the first embodiment, a plurality of information processing devices are not needed to be combined, so that the machine learning using the plurality of image data can be easily executed by one information processing device.

The image data is not required to be configured by only the symbol, but may include information other than the symbol. For example, for the image data of an indoor environment captured by a camera, data included in a sensor device may be disposed in the image data as the symbol. Alternatively, when the image data corresponds to the printed board, each of circuit components such as the IC or a passive circuit implemented on the printed board may be disposed in the image data as the symbol, and wiring connecting the plurality of symbols may be disposed in the image data.

Figure 7:
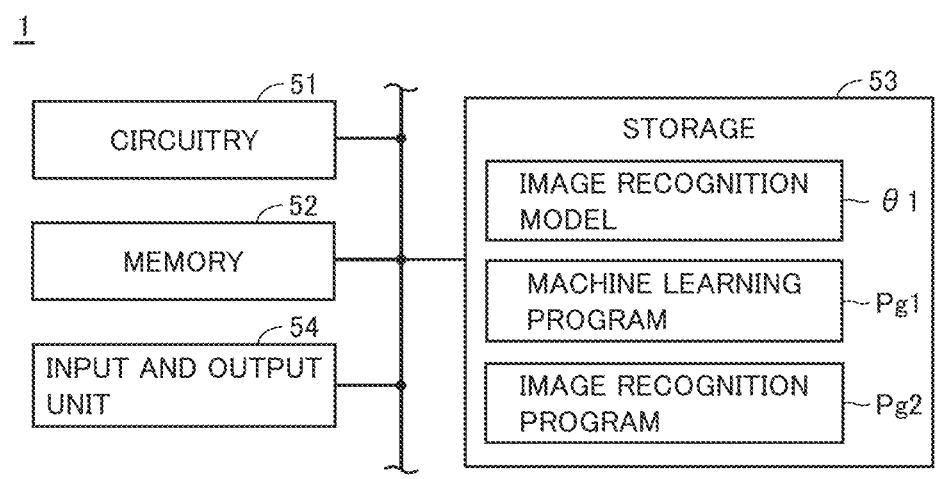
FIG. 7 is a block diagram illustrating a hardware configuration of the information processing device in FIG. 1.

FIG. 7 is a block diagram illustrating a hardware configuration of information processing device 1 in FIG. 1. As illustrated in FIG. 7, information processing device 1 includes circuitry 51, a memory 52 (storage unit), a storage 53 (storage unit), and an input and output unit 54. Circuitry 51 includes a central processing unit (CPU) that executes a program stored in memory 52. Circuitry 51 may further include a graphics processing unit (GPU). The function of information processing device 1 is implemented by software, firmware, or a combination of the software and the firmware. The software or the firmware is described as a program and stored in storage 53. Circuitry 51 develops the program stored in storage 53 in memory 52 and executes the program. The CPU is also called a central processing unit, a processing unit, an arithmetic unit, a microprocessor, a microcomputer, a processor, or a digital signal processor (DSP).

Memory 52 is a volatile storage device, and for example, includes a dynamic random access memory (DRAM) and/or a static random access memory (SRAM). Storage 53 is a nonvolatile storage device, and for example, includes a flash memory (solid state drive (SSD)), a hard disk drive (HDD), a read only memory (ROM), an erasable programmable read only memory (EPROM), an electrically erasable programmable read only memory (EEPROM)), a magnetic disk, a flexible disk, an optical disk, a compact disk, a mini disk, and/or a digital versatile disc (DVD).

Storage 53 stores image recognition model θ1, a machine learning program Pg1, and an image recognition program Pg2. Machine learning program Pg1 is a program that performs machine learning on image recognition model θ1. Image recognition program Pg2 is a program that infers the specific information from the image data using image recognition model θ1. Image recognition model θ1 is referred to in machine learning program Pg1 and image recognition program Pg2. Circuitry 51 that executes machine learning program Pg1 functions as training unit 10 in FIG. 1. Circuitry 51 that executes image recognition program Pg2 functions as inference unit 20 in FIG. 1.

Input and output unit 54 receives an operation from the user and outputs a processing result to the user. For example, input and output unit 54 includes a mouse, a keyboard, a touch panel, a display, and a speaker.

First Modification of First Embodiment

Figure 8:
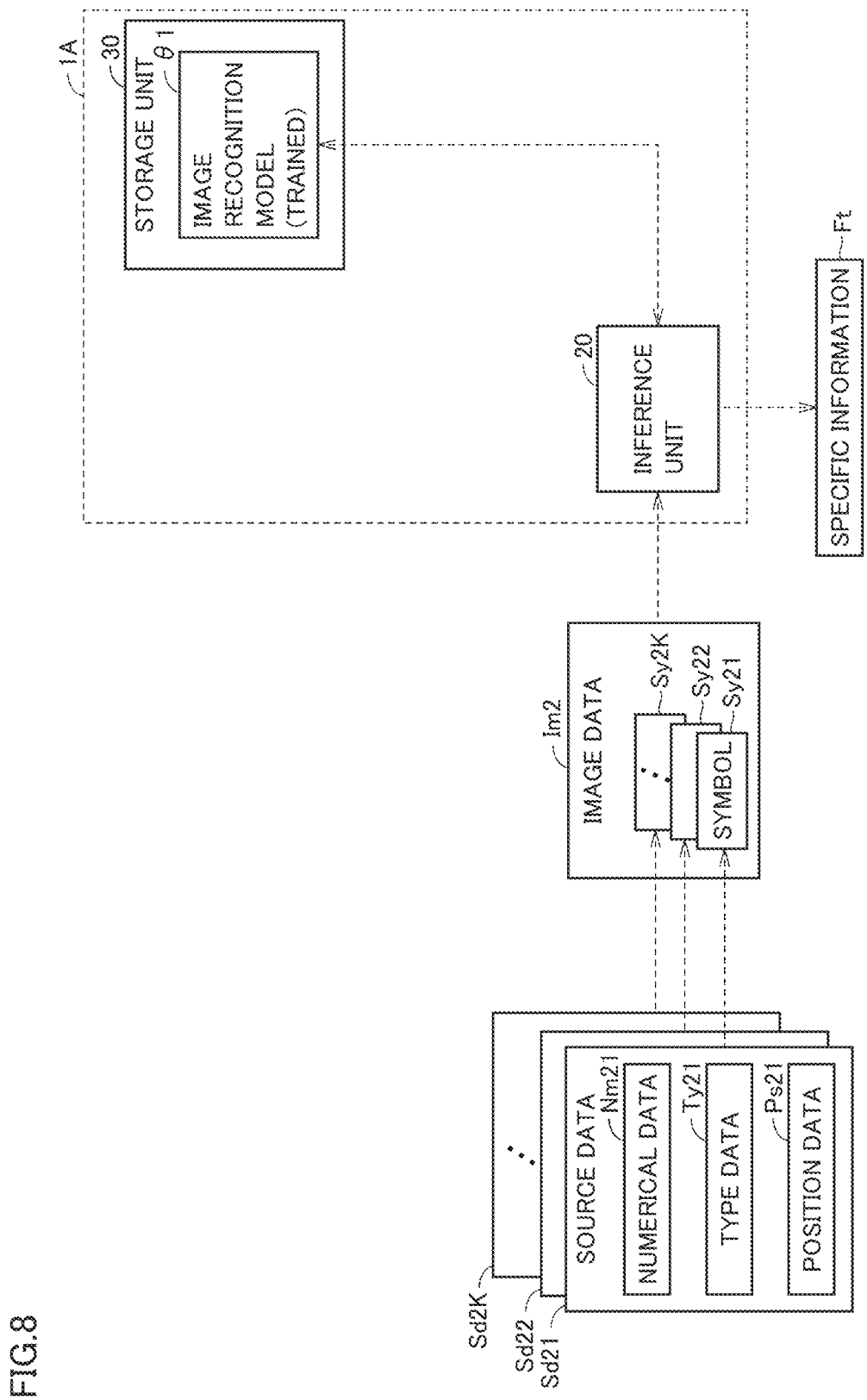
FIG. 8 is a block diagram illustrating a functional configuration of an information processing device according to a first modification of the first embodiment.

In the first embodiment, the information processing device including both the training unit and the inference unit has been described. In a first modification of the first embodiment, an information processing device that does not include the training unit will be described. FIG. 8 is a block diagram illustrating a functional configuration of an information processing device 1A according to the first modification of the first embodiment. The configuration of information processing device 1A is a configuration in which training unit 10 is excluded from information processing device 1 in FIG. 1. Because the configuration of information processing device 1A other than this is similar to the configuration of information processing device 1 in FIG. 1, the description of the configuration will not be repeated.

As illustrated in FIG. 8, trained image recognition model θ1 is stored in storage unit 30. Image recognition model θ1 is made into a trained model by the machine learning performed by a training device different from information processing device 1A.

Figure 9:
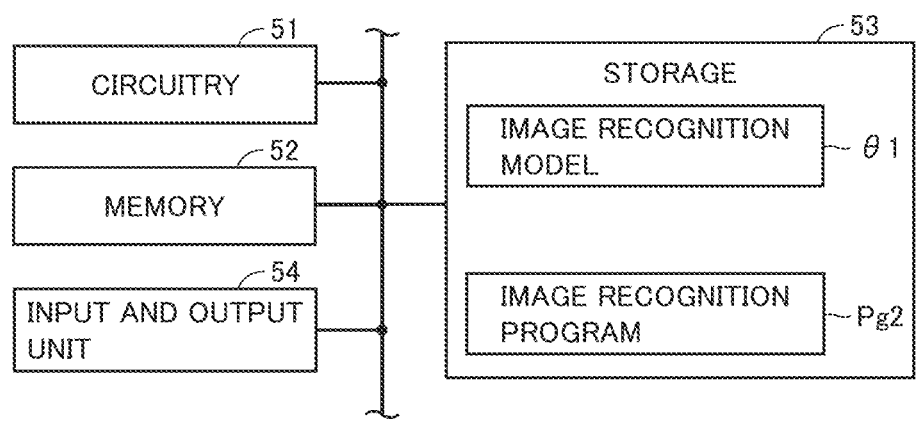
FIG. 9 is a block diagram illustrating a hardware configuration of the information processing device in FIG. 8.

FIG. 9 is a block diagram illustrating a hardware configuration of information processing device 1A in FIG. 8. The hardware configuration of information processing device 1A is a hardware configuration in which machine learning program Pg1 is excluded from storage 53 in FIG. 7. Because other hardware configurations of information processing device 1A are similar to the hardware configurations of information processing device 1, the description of the hardware configuration will not be repeated.

Second Modification of First Embodiment

Figure 10:
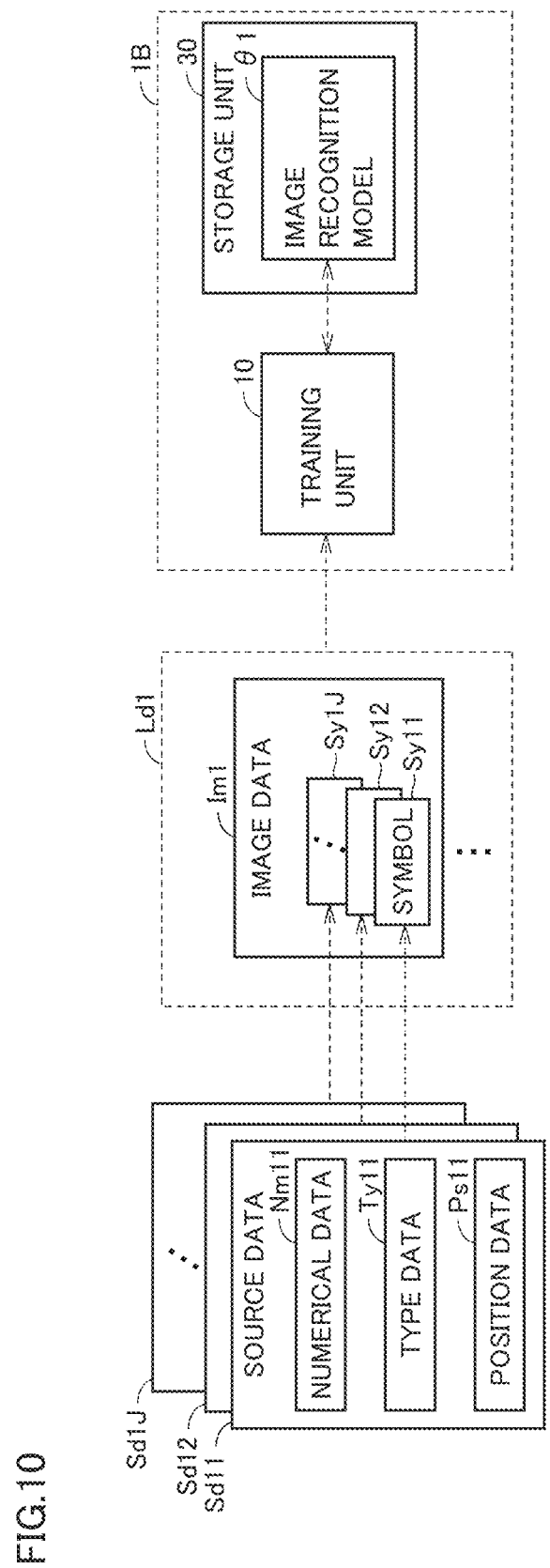
FIG. 10 is a block diagram illustrating a functional configuration of an information processing device according to a second modification of the first embodiment.

In a second modification of the first embodiment, an information processing device that does not include the inference unit will be described. FIG. 10 is a block diagram illustrating a functional configuration of an information processing device 1B according to the second modification of the first embodiment. The configuration of information processing device 1A is the configuration in which inference unit 20 is excluded from information processing device 1 in FIG. 1. Because the configurations of information processing device 1B other than this is similar to the configuration of information processing device 1 in FIG. 1, the description of the configuration will not be repeated.

Figure 11:
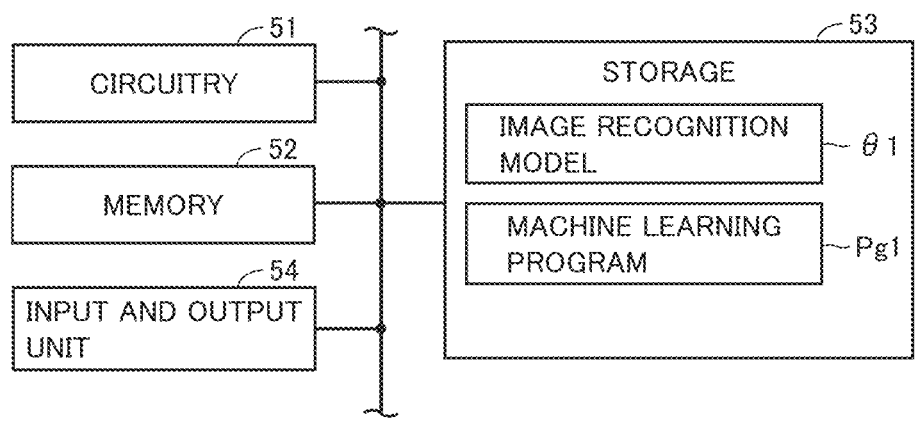
FIG. 11 is a block diagram illustrating a hardware configuration of the information processing device in FIG. 10.

FIG. 11 is a block diagram illustrating a hardware configuration of information processing device 1B in FIG. 10. The hardware configuration of information processing device 1B is a hardware configuration in which image recognition program Pg2 is removed from storage 53 in FIG. 7. Because other hardware configurations of information processing device 1B are similar to the hardware configurations of information processing device 1, the description of the hardware configuration will not be repeated.

As described above, according to the information processing devices of the first embodiment and the first and second modifications, the reflection of the relevance between the numerical data and the position information in the processing for the image data can be easily implemented by the information processing device that performs the processing.

Second Embodiment

Figure 12:
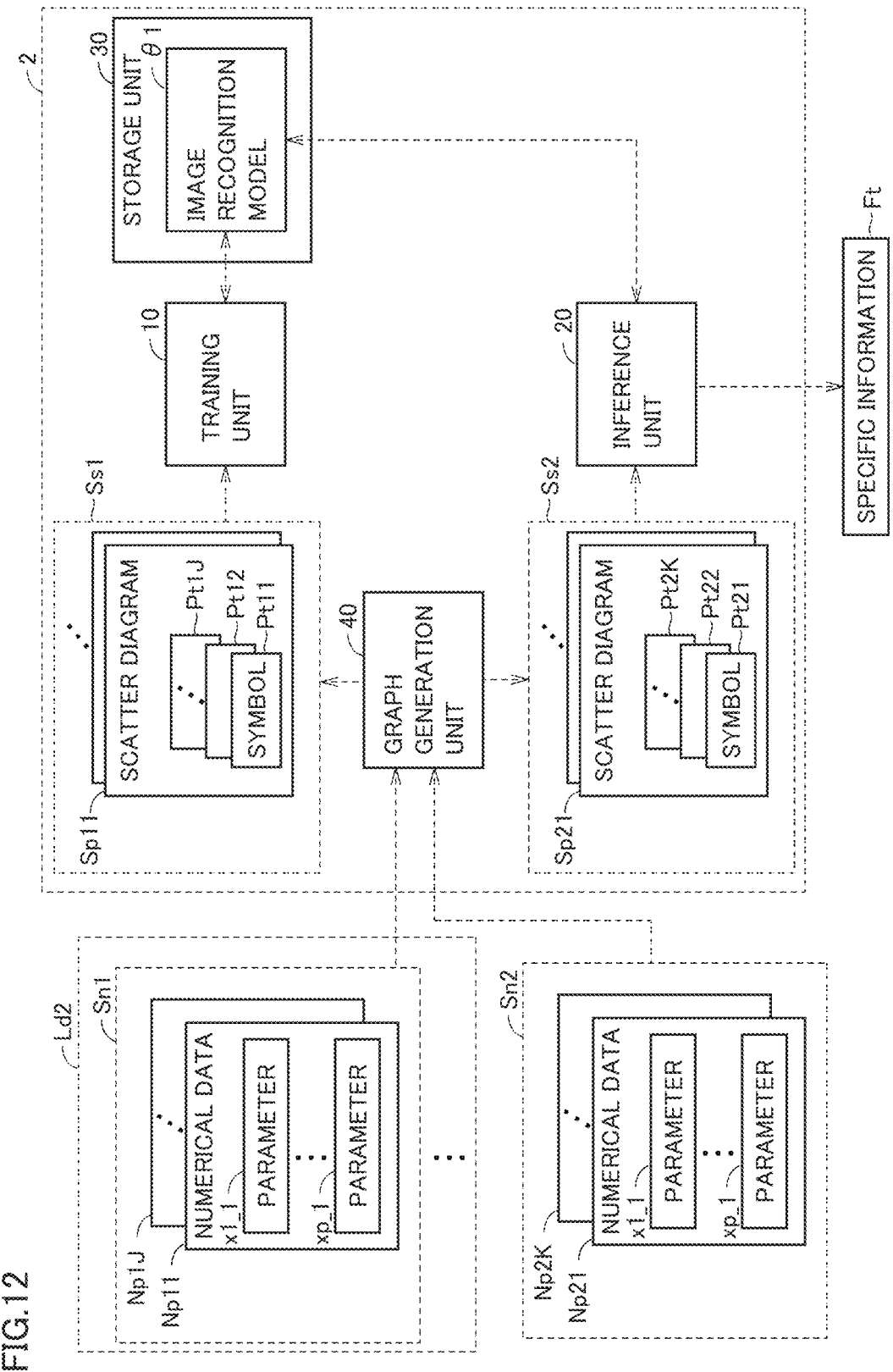
FIG. 12 is a block diagram illustrating a functional configuration of an information processing device according to a second embodiment.

A configuration in which a relationship between a plurality of parameters included in the numerical data is converted into a scatter diagram to infer a relational expression (specific information) between the plurality of parameters from a shape of the scatter diagram (image data) will be described in a second embodiment. FIG. 12 is a block diagram illustrating a functional configuration of an information processing device 2 according to a second embodiment. The functional configuration of information processing device 2 is a functional configuration in which a graph generation unit 40 is added to information processing device 1 in FIG. 1. Because other functional configurations are similar to those of information processing device 1, the description of the functional configurations will not be repeated.

As illustrated in FIG. 12, training data Ld2 includes a numerical data set Sn1. Numerical data set Sn1 includes a plurality of numerical data Np11 to Np1J. Numerical data Np1$j$ includes a plurality of parameters x1_j to xp_j (p is a natural number greater than or equal to 2). The plurality of parameters x1_j to xp_j include an explanatory variable and an objective variable.

Graph generation unit 40 receives numerical data set Sn1, generates a scatter diagram set Ss1 including a scatter diagram Sp11 (image data), and outputs scatter diagram set Ss1 to training unit 10. Scatter diagram Sp11 includes a plurality of symbols Pt11 to Pt1J. The plurality of symbols Pt11 to Pt1J correspond respectively to numerical data Np11 to Np1J, and correspond respectively to a plurality of points plotted on scatter diagram Sp11.

Graph generation unit 40 receives a numerical data set Sn2, generates a scatter diagram set Ss2 including a scatter diagram Sp21 (image data), and outputs scatter diagram set Ss2 to inference unit 20. Numerical data set Sn2 includes a plurality of numerical data Np21 to Np2K. Numerical data Np2$k$ includes a plurality of parameters x1_k to xp_k. Scatter diagram Sp21 includes a plurality of symbols Pt21 to Pt2K. The plurality of symbols Pt21 to Pt2K correspond respectively to numerical data Np21 to Np2K, and correspond respectively to a plurality of points plotted on scatter diagram Sp21.

Figures 13, 14:
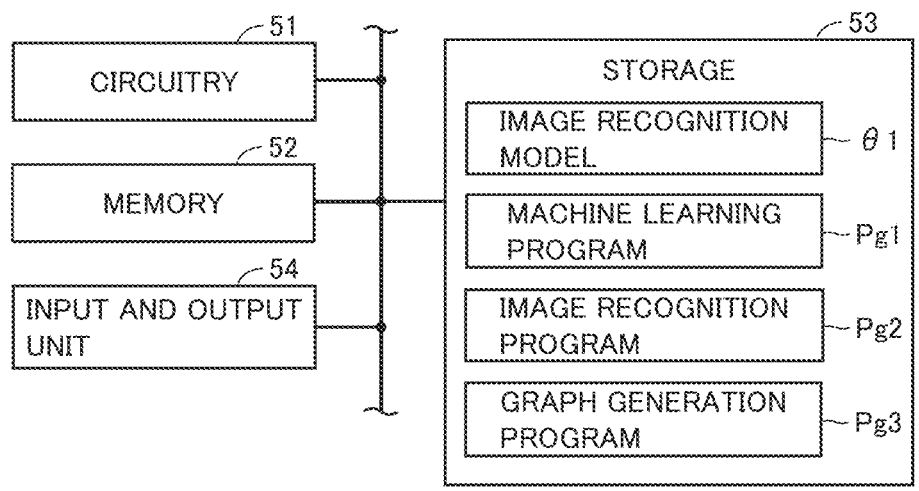
FIG. 13 is a block diagram illustrating a hardware configuration of the information processing device in FIG. 12.
FIG. 14 is a view illustrating an example of a numerical data set in FIG. 12.

FIG. 13 is a block diagram illustrating a hardware configuration of information processing device 2 in FIG. 12. The hardware configuration of information processing device 2 is a configuration in which a graph generation program Pg3 is added to storage 53 in FIG. 7. Because the hardware configuration of information processing device 2 other than this is similar to that of information processing device 1, the description thereof will not be repeated. As illustrated in FIG. 13, graph generation program Pg3 is a program that receives the numerical data set and generates the scatter diagram set. Circuitry 51 that executes graph generation program Pg3 functions as graph generation unit 40 in FIG. 12.

FIG. 14 is a view illustrating an example of numerical data set Sn1 in FIG. 12. FIG. 14 illustrates the case where a natural number p in FIG. 12 is 3. As illustrated in FIG. 14, each of the plurality of numerical data Np11 to Np1J included in numerical data set Sn1 includes parameters x1, x2 as the explanatory variables and a target value y as the objective variable. In FIG. 14, a parameter xp(x3) in FIG. 12 is expressed as target value y.

Figure 15:
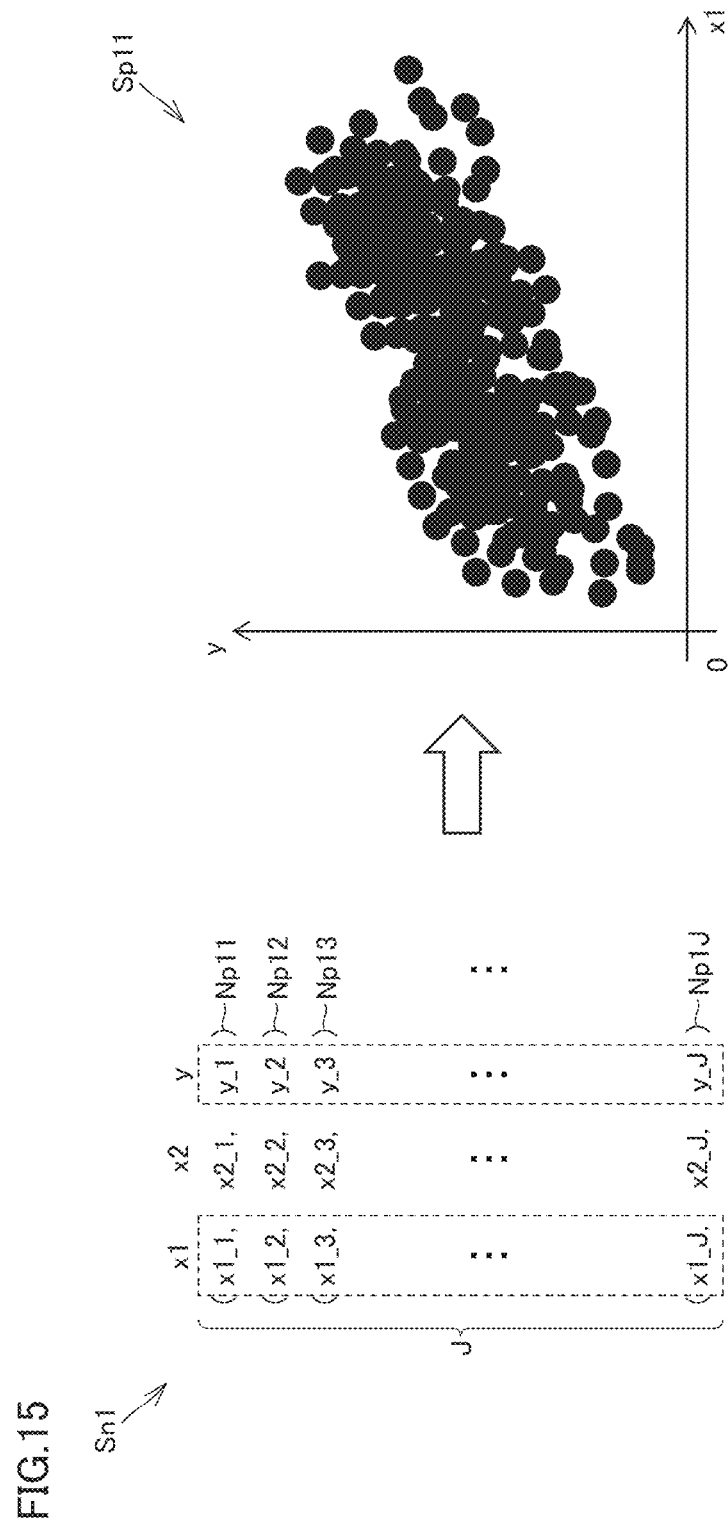
FIG. 15 is a scatter diagram illustrating a correspondence relationship between a certain parameter and a target value.
Figure 16:
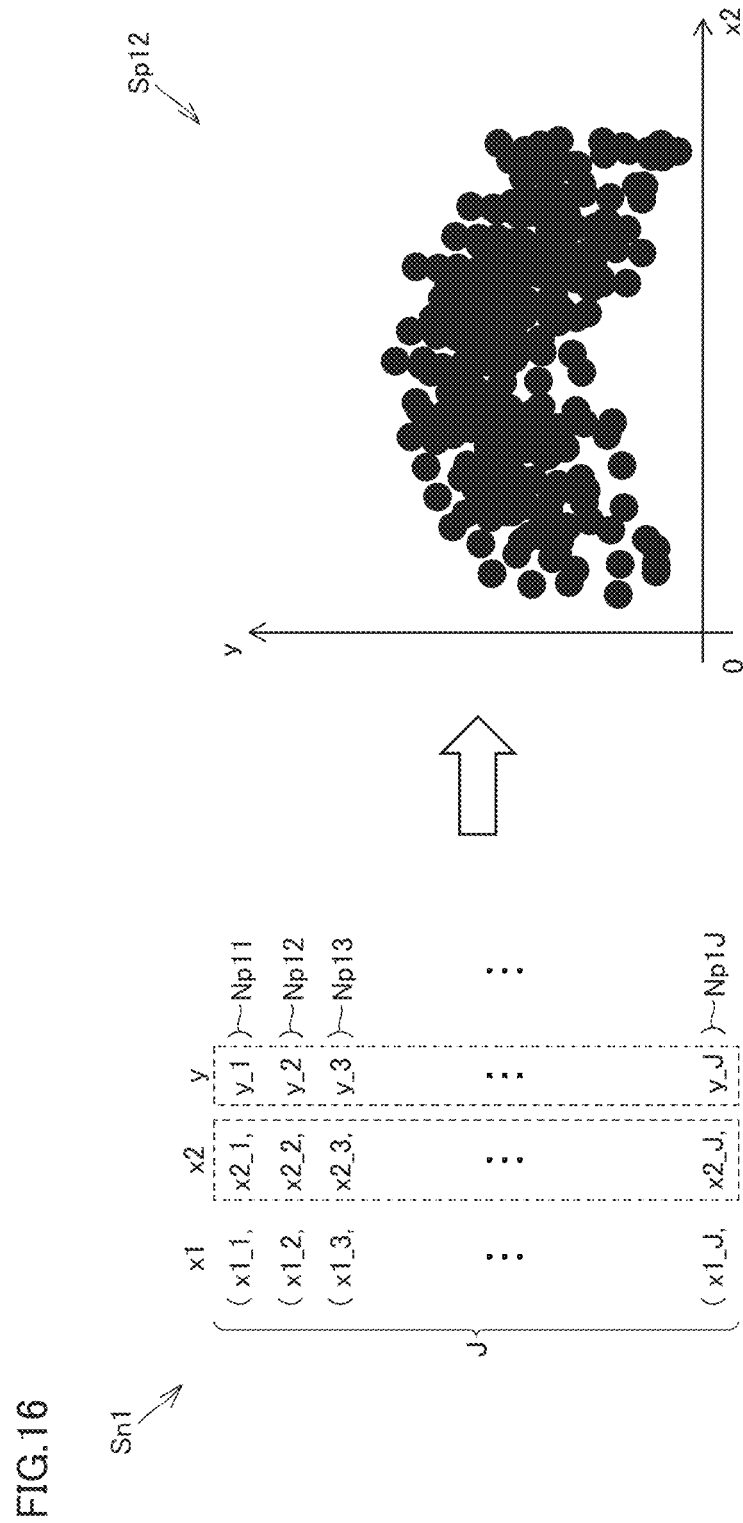
FIG. 16 is a scatter diagram illustrating a correspondence relationship between another parameter and the target value.
Figure 17:
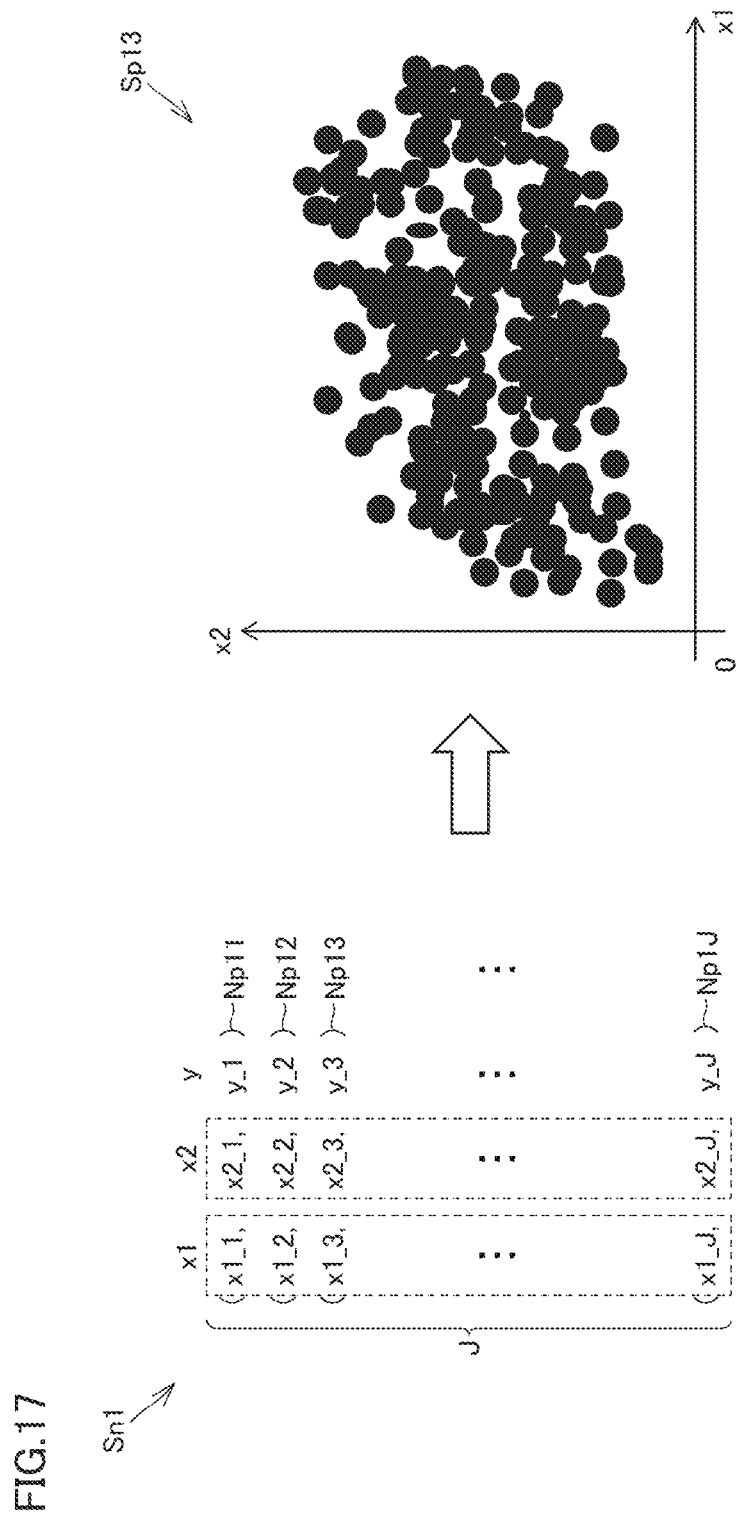
FIG. 17 is a scatter diagram illustrating a correspondence relationship between two parameters.

FIG. 15 is scatter diagram Sp11 illustrating a correspondence relationship between a certain parameter x1 and target value y. As illustrated in FIG. 15, scatter diagram Sp11 has two coordinate axes corresponding respectively to parameters x1, x2. FIG. 16 is a scatter diagram Sp12 illustrating a correspondence relationship between another parameter x2 and target value y. As illustrated in FIG. 16, scatter diagram Sp12 has two coordinate axes corresponding respectively to parameters x2, y. FIG. 17 is a scatter diagram Sp13 illustrating a correspondence relationship between two parameters x1, x2. As illustrated in FIG. 17, scatter diagram Sp13 has two coordinate axes corresponding respectively to parameters x1, x2.

In the second embodiment, because the parameter included in the numerical data is a coordinate in the scatter diagram, the numerical data also serves as position information. The number of dimensions of the scatter diagram is not limited to two, but may be at least three. For example, a three-dimensional scatter diagram may be formed by setting the parameter x1 to the x-axis, setting the parameter x2 to the y-axis, and setting target value y to the z-axis. In addition, each point of the scatter diagram is not required to be a circle, but may have any size and any shape. However, when a certain point and another point overlap each other by at least a half, information of one point is lost, so that a dimension of the point is desirably smaller than or equal to a dimension that does not overlap the other point by at least a half.

Figure 18:
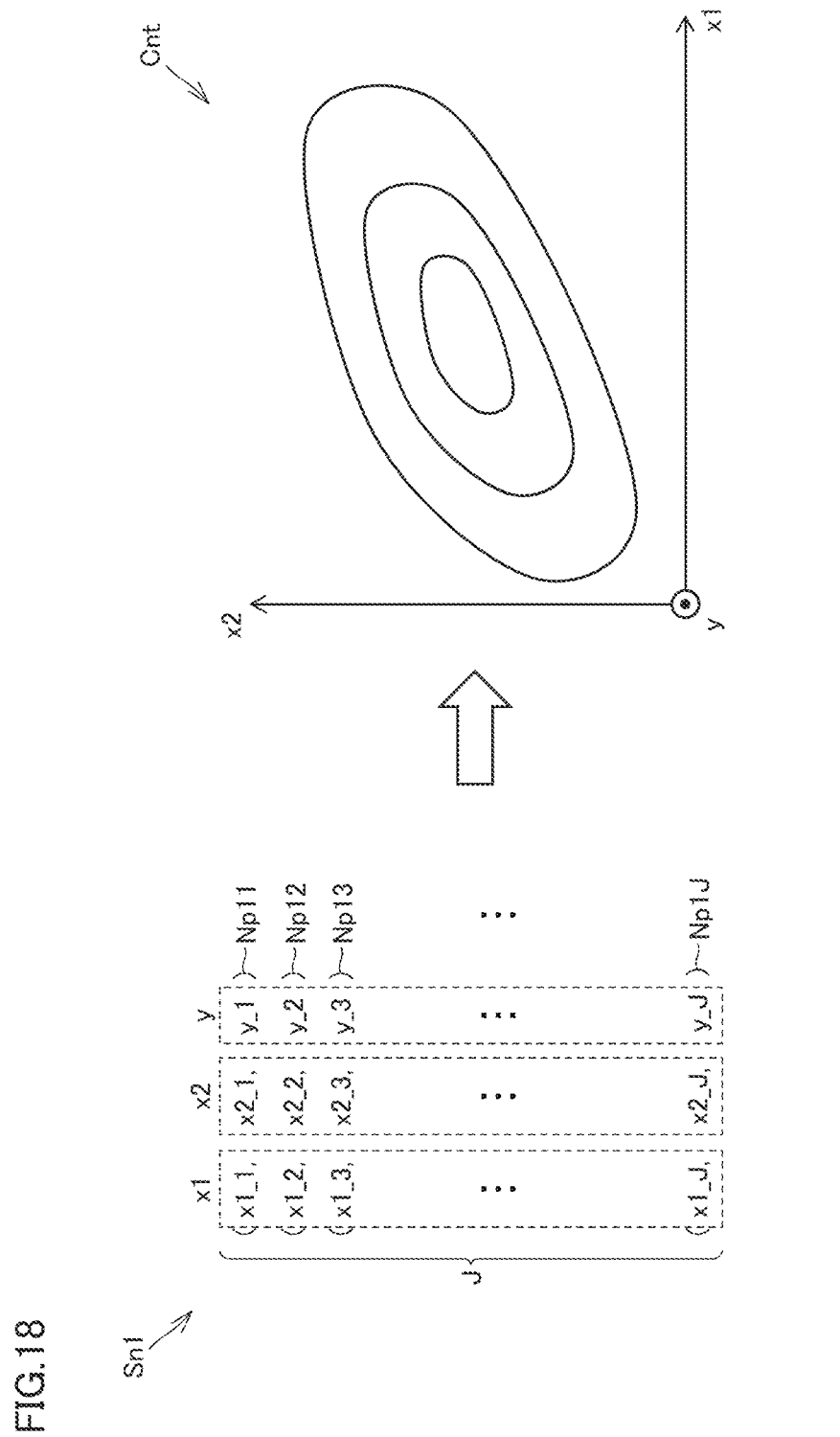
FIG. 18 is a view illustrating an example of contour lines.
Figure 19:
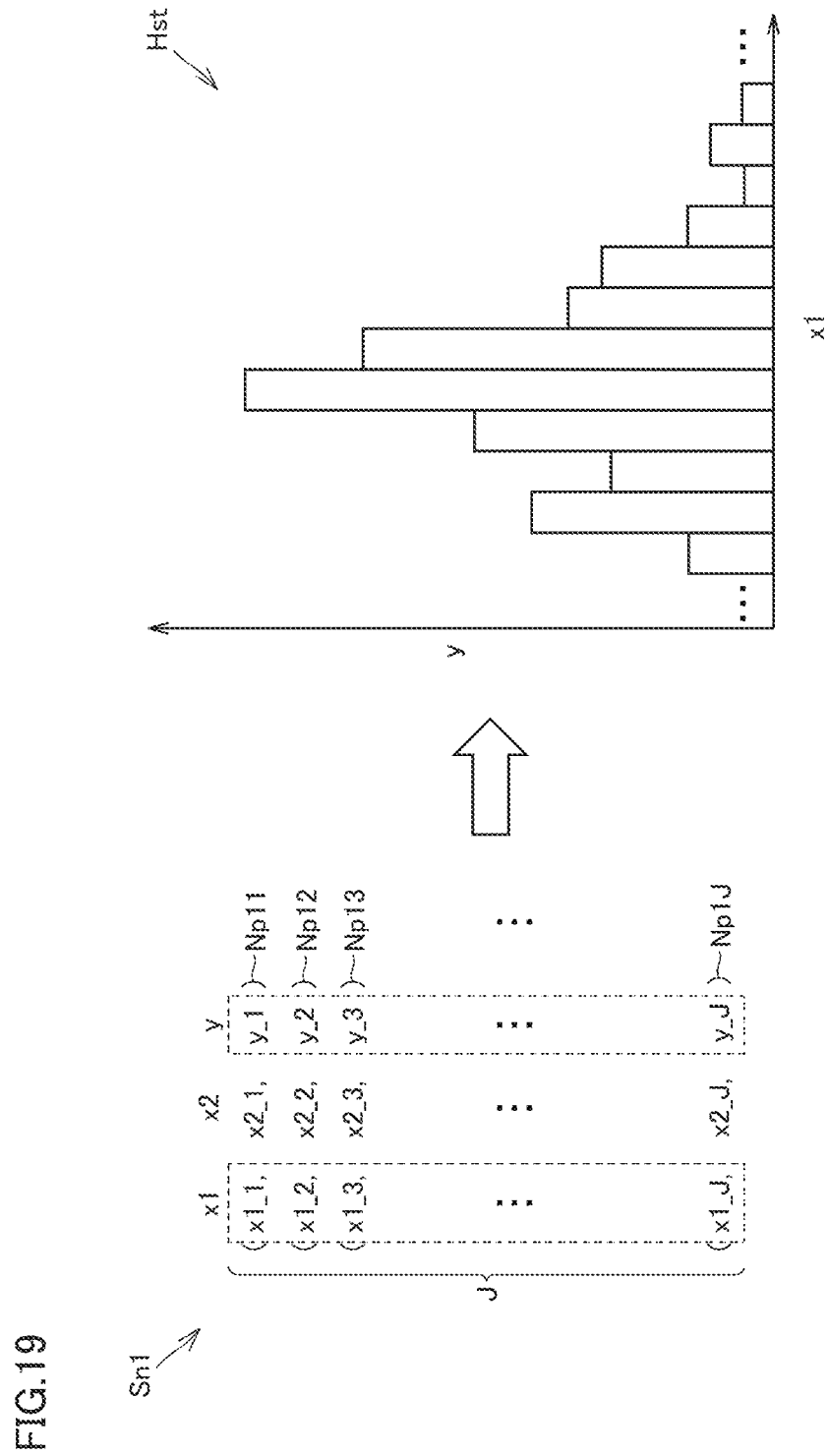
FIG. 19 is a view illustrating an example of a histogram.

The image data formed from the numerical data is not limited to the scatter diagram, but for example, may be a contour line Cnt as illustrated in FIG. 18 or a histogram Hst as illustrated in FIG. 19. However, the format of the image data may be any format, but the training processing and the inference processing on the image data are desirably the image data generated by the graph generation unit of the same algorithm.

A range of the axis of the scatter diagram is desirably a range including the maximum value and the minimum value of each of the plurality of parameters included in the numerical data, and desirably the value (scale) of the axis is not described in the image data when the image data is input to the information processing device. In the case where the number of numerical data is relatively small (for example, less than or equal to 100 points), the image data formed from the plurality of numerical data is desirably the contour line. The data represented as a graph in the image data may be continuous by interpolation with respect to the plurality of numerical data, and a tendency of the plurality of numerical data can be grasped even when the number of numerical data (points) is small by the interpolation. New numerical data may be generated by a generation model such as a generative adversarial network (GAN). The shade of the color in the region with high density or the region with large amplitude like a contour line or a histogram does not to increase, the shade of the color in the region with low density or the region with small amplitude is not required to decrease, and these regions may be expressed as regions having the same height or the same size. However, when the numerical data can be increased, desirably the numerical data is increased, and more desirably the numerical data is increased such that the distribution becomes uniform (uniform distribution).

Extraction of an envelope, an approximate straight line, or an approximate curve that are parallel to each other and are the maximum value and the minimum value of the scatter diagram from the scatter diagram formed from the plurality of numerical data will be described below. A method for extracting the envelope, the approximate straight line, or the approximate curve from the scatter diagram may be any method, and for example, includes the extraction of parallel constituents by Hilbert transformation, a round robin algorithm with the scatter diagram in which a previously-prepared relational expression is known, the image processing using a previously-trained convolutional neural network that determines whether the envelope, the approximate straight line, or the approximate curve is parallel by binary classification, or the image processing that calculates a degree of coincidence obtained by horizontally moving the image.

Figure 20:
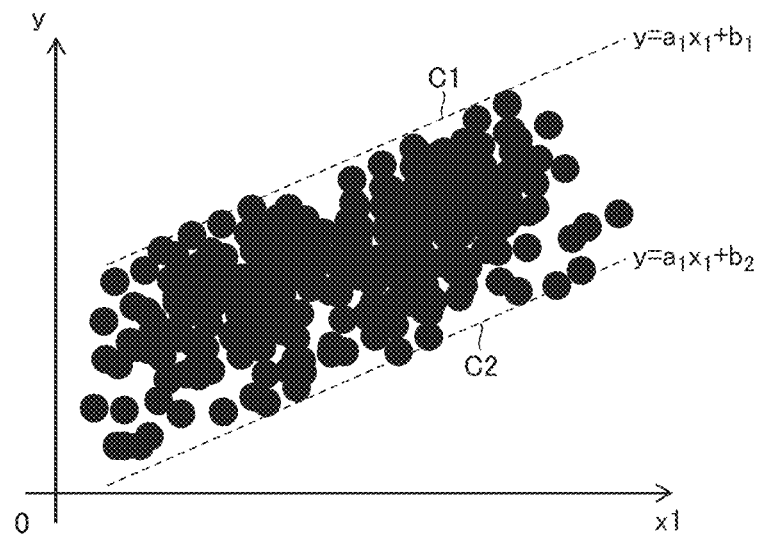
FIG. 20 is a scatter diagram formed from a plurality of numerical data, and a view illustrating a straight line that is an envelope of a maximum value of the scatter diagram and a straight line that is an envelope of a minimum value of the scatter diagram together.

FIG. 20 is a scatter diagram formed from a plurality of numerical data, and a view illustrating a straight line C1 (first envelope) that is an envelope of a maximum value of the scatter diagram and a straight line C2 (second envelope) that is an envelope of a minimum value of the scatter diagram together. The plurality of points distributed in the scatter diagram are distributed between the first envelope and the second envelope. The interval between the first envelope and the second envelope in the direction of the specific axis (coordinate axis of objective variable y in FIG. 21) representing the specific parameter is the shortest between two parallel curves including the plurality of points therebetween. For the purpose of simplifying the description, it is assumed in FIG. 20 that envelope curves C1, C2 are linear functions representing the objective variables and are parallel to each other. As illustrated in FIG. 20, an inclination of envelope curves C1, C2 are obtained as a1. A linear function representing each of envelope curves C1, C2 is a relational expression representing objective variable y. The relational expression includes a term a1×x1 regarding parameter x1. By obtaining an inclination a1, it can be seen that the relationship of the sum or difference between the parameter configuring the scatter diagram in FIG. 20 and the objective variable. It is assumed that the inclination in the polynomial representing the objective variable is a coefficient of a parameter term having the highest degree.

Figure 21:
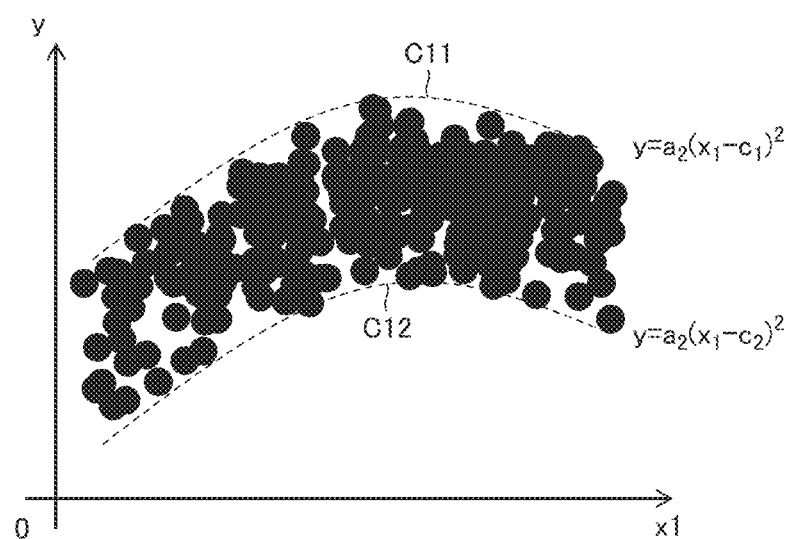
FIG. 21 is a scatter diagram formed from the plurality of numerical data, and a view illustrating a parabola that is the envelope of the maximum value of the scatter diagram and a parabola that is the envelope of the minimum value of the scatter diagram together.

FIG. 21 is a scatter diagram formed from the plurality of numerical data, and a view illustrating a parabola C11 that is the envelope (first envelope) of the maximum value of the scatter diagram and a parabola C12 that is the envelope (second envelope) of the minimum value of the scatter diagram together. In FIG. 21, the case where a polynomial is a second-order convex function is illustrated as an example of the case where the envelope of the scatter diagram is represented as the polynomial. As illustrated in FIG. 21, envelope curves C11, C12 are parallel, so that it can be seen that a sum or difference relationship exists between the two parameters forming the scatter diagram exists. The inclination of envelope curves C11, C12 is a coefficient a2.

For example, in FIG. 20, when f(•) is a certain function, it can be seen that the relationship of y=a1×x1+f(x2) among the target value y (first parameter), parameter x1 (second parameter), and parameter x2 (third parameter) exists. At this point, function f(•) can be estimated by obtaining the relational expression (x3=f(x2)) between parameters x3 and x2 with the difference (y−a1×x1) between objective variable y and term a1×x1 regarding parameter x1 as a new parameter x3 (fourth parameter). Because the plurality of numerical data often configures only positive values or only negative values, constituents of the sum and difference in the scatter diagram can be extracted by obtaining the logarithm of y−a1×x1 or the logarithm of f(x2). When the minimum value of the target value y is b, the logarithm of y−a1×x1−b can be obtained by replacing y−a1×x1 with y−a1×x1−b. An average value or a variance value of the parameter included in the plurality of numerical data may be changed, or standardization or normalization may be performed such that the minimum value of the parameter is larger than 0.

However, when function f is expressed as f(x2)=a2×x2+ d2 (a2, d2 are constants), the processing for obtaining the logarithm is not always required to be performed. Furthermore, when the parallel constituent cannot be extracted from the scatter diagram like the case where the relationship between parameters y and x1 is expressed as y=a1×x1+b1 (b1 is a constant), a desired mathematical formula can be generated by taking the logarithm for each parameter. Furthermore, when explanatory variables x1 and x2 are parallel, the mathematical formula is generated from constituents that can be considered to be parallel, such as x2=a3×x1+d3 (a3, d3 are constants), and simultaneous equations are solved from each component, whereby the desired mathematical formula can be generated.

For example, when there is no correlation in the scatter diagrams of explanatory variables x1, x2, the relationship between parameters y, x1, x2 is expressed as y=f(x1)+f(x2), so that the formula of target variable y can be derived by extracting the constituent of y=f(x1) and the constituent of y=f(x2). Furthermore, in the case where the relationship among parameters y, x1, x2 is expressed as y=f(x1,x2), when the relationship between explanatory variables x1, x2 is expressed as x2=a3×x1+d3 from the scatter diagram of explanatory variables x1, x2 as described above, the relationship between parameters y, x1 can be expressed as y=g(x1) using a certain function g by substituting the constituents of the expression for explanatory variable x1 based on the solution of the simultaneous equation. As a result, the desired mathematical expression can be derived by performing processing such as the extraction of parallelism or the calculation of logarithms of both sides.

Figure 22:
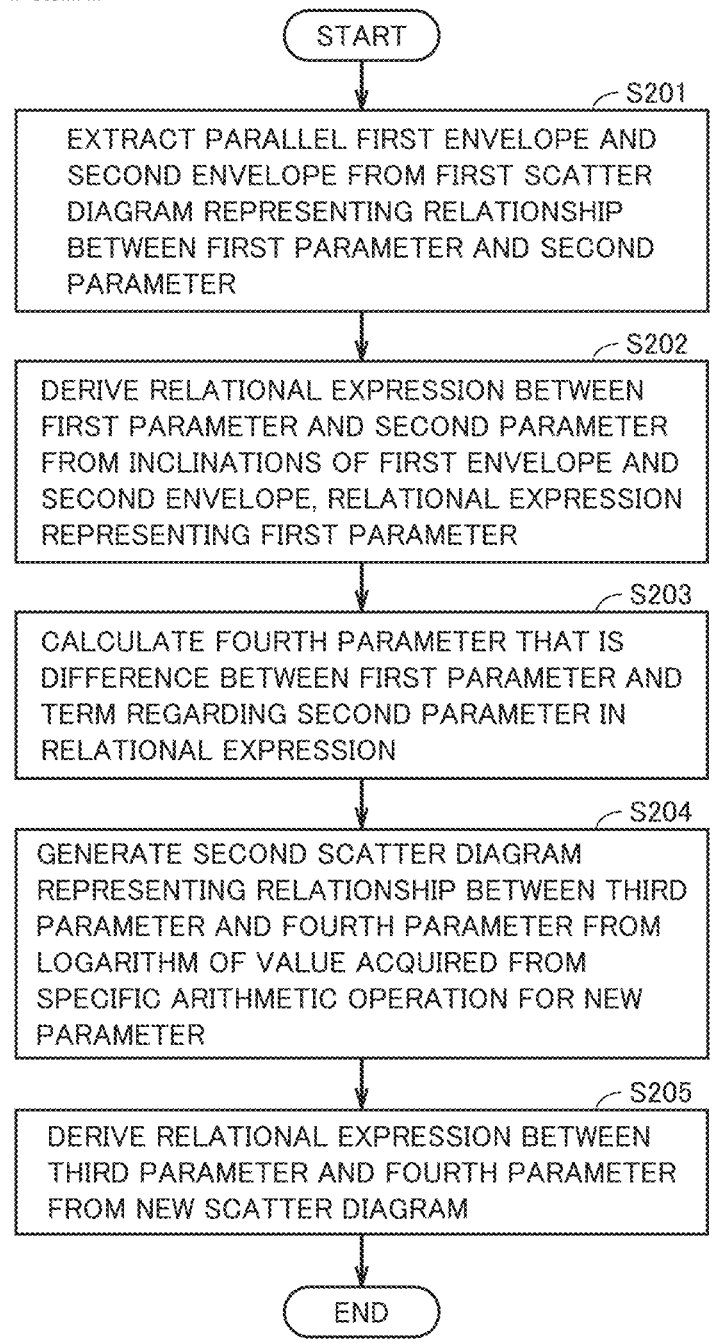
FIG. 22 is a flowchart illustrating an example of processing performed by an inference unit in FIG. 12.

FIG. 22 is a flowchart illustrating an example of the processing performed by inference unit 20 in FIG. 12. Hereinafter, the step is simply referred to as S. As illustrated in FIG. 22, in S201, inference unit 20 extracts the first and second envelopes, which are parallel to each other, from the first scatter diagram representing the relationship between the first parameter and the second parameter, and advances the processing to S202. In S202, inference unit 20 derives a first relational expression between the first parameter and the second parameter from the inclination of the first envelope and the second envelope, the first relational expression representing the first parameter, and inference unit 20 advances the processing to S203. In S203, inference unit 20 calculates a fourth parameter that is a difference between the first parameter and the term regarding the second parameter included in the relational expression calculated in S202, and advances the processing to S204. In S204, inference unit 20 generates a new scatter diagram (second scatter diagram) representing the relationship between the third parameter and the fourth parameter from a logarithm of the value acquired from a specific arithmetic operation for the fourth parameter calculated in S203, and advances the processing to S205. The specific arithmetic operation performed in S203 includes the four arithmetic operations in the process of deriving the logarithm of an absolute value of the fourth parameter. In S205, inference unit 20 derives a second relational expression between the third parameter and the fourth parameter from the second scatter diagram generated in S204, and ends the processing.

When the information processing device using artificial intelligence (trained model) is used in the process of deriving the parallel envelope from the scatter diagram, only the parallel constituents can be accurately extracted from the scatter diagram using a model corresponding to a binary classification problem of parallelism and non-parallelism. In addition, even in the scatter diagram that is difficult to analyze due to inclusion of the non-parallel constituent, the relational expression of the plurality of parameters may be calculated using an image processing model corresponding to a previously-trained multi-level classification problem. In addition, the relational expression of the plurality of parameters may be derived by a technique using the trained model obtained by the machine learning of the scatter diagram, Bayesian optimization including a Gaussian process, a genetic algorithm, or the like, and a mathematical formula that sums up the derivation results of all the envelope to express the objective variable with the parameter may be calculated after the parameters included in the numerical data are reduced by separating the addition or subtraction constituent. In this multi-value classification problem, all of the exponential function, the multiplication constituent, and the addition constituent become linear functions of the sum and the difference by obtaining the logarithm as described above. Consequently, the number of classifications can be greatly reduced. As a result, the classification accuracy can be improved. For example, $y\propto(x1)^2$ and $y\propto(x1)^{2.5}$ are required to be processed as separate classification problems. Because the exponent of the relational expression is an analog value, training for detailed classification is required. On the other hand, when the logarithm of the relational expression is obtained, the relational expression can be expressed as $\log(y)\propto \log(x1)$, so that the relationship between parameters y, x1 can be expressed by only one equation. Thus, the number of classifications can be reduced, so that not only the data used at the time of training can be reduced, but also the classification accuracy can be improved.

As compared with the conventional method for extracting the relational expression of the plurality of parameters only by the numerical data, when the relational expression is derived from the scatter diagram of the numerical data, the relational expression of the plurality of parameters can be derived with higher accuracy in a shorter time than the brute force method or a method such as the genetic algorithm using all data. When each of the plurality of numerical data is analyzed, because the relationship between the parameters increases as the number of numerical data increases, the calculation amount increases exponentially. On the other hand, in the case of the image data such as the scatter diagram, the solution can be calculated by the calculation of the image processing on the image data regardless of the number of numerical data. In addition, the calculation amount required to generate the scatter diagram, the contour line, or the histogram is relatively small, and the processing required to generate the scatter diagram, the contour line, or the histogram can be parallelized. Accordingly, for example, the fact that each of the plurality of parameters is at least 100 million points of the big data is not a condition that limits the calculation amount of the processing of the big data. Furthermore, according to the method for deriving the relational expression from the scatter diagram of the numerical data, unlike the genetic algorithm or the like that starts the calculation without being based on the prior knowledge for each calculation, the trained model (prior knowledge) can be reused even when the neural network such as the CNN is used for parallel or non-parallel determination processing, parallel or non-parallel extraction processing, or the like. Consequently, only inference is required when the formula is predicted in the method, so that the relational expression can be derived at high speed.

However, the formula derived in the second embodiment is an approximate value (first order approximation), and it is difficult to calculate with a strict value including a constant. Therefore, after the relational expression of the plurality of parameters or the plurality of candidates of the relational expression are calculated from the scatter diagram, the constant term of the relational expression may be fitted by an optimization technique such as the steepest descent method or the Newton method using the relational expression as the initial condition, and the constant term with the highest fitting accuracy may be calculated as the solution of the relational expression. In general, when the Newton method is used in this way, sometimes the solution falls into the minimum value or unknown data cannot be expressed by the trained model due to over-training. However, the processing, in which the solution hardly falls into the minimum value and the over-training is hardly performed, can be implemented when the relational expression includes only a fixed constant. For example, when an equivalent circuit is calculated from the obtained measured values, the exact parameter can be easily calculated by the fitting when the combination of components configuring the equivalent circuit and the approximate value of each parameter of the components configuring the equivalent circuit are known. Accordingly, the method described in the second embodiment provides the combination of components and the approximate value of each parameter of the component.

In the case where the general numerical data is used, even when the maximum value or the minimum value for each parameter is connected, it is often not completely parallel. Depending on a computing time or computing resource that can be spent, approximately within ±10% of the inclination may be considered parallel. However, it may be set to be parallel within ±1% of the inclination in the case where there is a margin in the calculation resource, and it may be set to be parallel within ±20% of the inclination in the case where there is no margin in the calculation resource. The stricter the determination of parallelism, the higher the accuracy of the relational expression of the plurality of parameters, but the more calculation resources are required. However, according to the second embodiment, a rough approximate expression of the relational expression of the plurality of parameters can be easily obtained even in the case where there is no sufficient calculation resource. The envelope is not necessarily the straight line, but may be a polynomial, a trigonometric function, or a combination thereof. When the envelope of the maximum value and the relational expression of the plurality of parameters of the minimum value are parallel to each other, the coefficient of the polynomial approximation described above or periodicity of a trigonometric function may be calculated from the scatter diagram.

By separating the addition constituent or the subtraction constituent from the relationship between the parameters and obtaining the logarithm of the target value (target variable) or the parameter (explanatory variable), the multiplication constituent, the exponential constituent, or the logarithm component can be calculated as addition or subtraction. Consequently, the parameters can be further analyzed by the scatter diagram using the same algorithm as the algorithm in which the addition or the subtraction is separated, and the relational expression of the plurality of parameters can be derived. In addition, when the two envelopes are not parallel even when the logarithm is obtained, it is considered that the addition or subtraction constituent remains in the relationship between the parameters, so that a calculation error can be corrected in the process of deriving the envelope.

When the logarithm is not used, because complicated arithmetic operations such as four arithmetic operations, exponents, logarithms, and trigonometric functions are combined, the information processing device that processes the scatter diagram is required to predict a huge number of combination results or to generate a comparison diagram. On the other hand, an approximate tendency is grasped with the parallel constituent, only the constituent that cannot be expressed only with the parallel constituent is analyzed by the information processing device, and the relational expression of the plurality of parameters is derived, so that the required relational expression can be derived at a higher speed and with higher accuracy than those in the related art because of the reduced number of combinations of the arithmetic operation. In particular, in a technical field called symbolic regression, a problem of deriving the mathematical expression from data is known as a non-deterministic polynomial (NP) difficult problem, and it is difficult to derive the correct answer with a realistic computer and calculation time only by conventional comparison calculation processing between data. On the other hand, according to the second embodiment, the comparison operation can be made unnecessary using an image such as a scatter diagram, a contour line, or a histogram. In particular, the case of using the scatter diagram is defined as scattering symbolic regression, and the case of using the image such as the contour line or the histogram is defined as image symbolic regression. Furthermore, the relationship between the data is decomposed by logarithmic processing in the scattering symbolic regression or the image symbolic regression, so that the relational expression can be derived regardless of the number of data even for the above NP-difficult problem according to the second embodiment. However, because the argument (true number) of the logarithm is limited to a real number larger than 0 in the processing for obtaining the logarithm, 0 or a negative number is converted into a real number larger than 0 by scale processing such as standardization or averaging. In addition, the parameter included in the numerical data may be a complex number in which a norm is not 0. When the norm is 0, the argument of the logarithm can be obtained by adding a minute amount such as a computer epsilon to the norm.

Although the conversion of the numerical data into the scatter diagram has been described above, the image data including the symbol described in the first embodiment may be converted into the numerical data by smoothing, and the numerical data may be processed by the method of the second embodiment to derive the relational expression of the plurality of parameters. In this case, assuming that 1,000 pieces of image data of M×N pixels (M, N are positive integers) are prepared, numerical data of 1,000 rows and M×N columns can be generated by smoothing each of the plurality of image data. Using the numerical data, (M×N+1) scatter diagrams representing the relationship of parameters between columns and (M×N+1) scatter diagrams of parameters of each column and correct answer labels can be generated from 1,000 numerical data.

Furthermore, in the case of the image data, when each of the plurality of pixels included in the image data is directly formed into the scatter diagram, information about the symbol included in the image data is degraded. This is because the information about two pixels adjacent to each other in the image data is lost. In order to prevent this, the convolution processing may be performed using a specific filter that can be expressed by the mathematical expression such as a Gaussian filter, or the scatter diagram may be generated from the image data to which the function serving as the image filter that can be expressed by the mathematical expression such as a low-pass filter, a band-pass filter, maximum value pooling, or average value pooling is applied, and the mathematical expression of the envelope may be expressed from the scatter diagram. In this way, although the mathematical expression becomes complicated, the relationship between the target value and the parameter can be expressed while a causal relationship is clear.

Furthermore, when the relational expression of the plurality of parameters is obtained with high accuracy, the convolution arithmetic operation, an activation function, or the like in the convolutional neural network may be applied to the scatter diagram, the feature value that becomes the output result thereof may be converted into the numerical data by the same method as described above, and the relational expression of the plurality of parameters may be derived from the scatter diagram generated from the numerical data. In this case, the arithmetic operation performed in the convolutional neural network is expressed as a plurality of determinants. The relational expression of the plurality of parameters can be derived from the result of the feature value extraction performed using the specific filter included in the convolutional neural network, so that the result obtained by the convolutional neural network can be determined as the mathematical expression.

In addition, in the symbol of the first embodiment, the equation considering the correlation between the plurality of symbols may be output as the relational expression. In particular, in the case where the plurality of circuit components implemented on the printed board are the plurality of symbols included in the image data, when the operation of the IC or the circuit component is different from the operation of the IC alone or the circuit component alone implemented on the printed board by mutual inductance that is magnetic coupling between the plurality of symbols or spatial coupling by parasitic capacitance (or stray capacitance) that is electric field coupling, the relationship between the IC and the circuit component can be grasped by deriving the relational expression. Conventionally, the relationship is processed in electromagnetic field simulation, actual measurement, or the like, and a derivation process thereof is a value that is difficult to grasp as a black box. However, according to the second embodiment, because the spatial coupling that does not appear in the circuit diagram or the circuit simulation can be expressed as the image data, an effect different from the conventional case can be obtained. Furthermore, the optimum positional relationship with respect to the target of the circuit design can be predicted using the relational expression without performing the simulation and actual measurement. In the image data, the position or size of the symbol may change according to the lapse of time. In addition, the condition in which information other than the symbol changes, such as wiring connecting two symbols, may also be included in the training data. Furthermore, a portion that does not change with time may not be expressed in the image data. In the EMC field, a portion that is required to be expressed in the image data may be limited to a portion that can change, such as a noise filter, a snubber circuit, or a shield structure. When the location represented in the image data, the calculation resource or/and calculation time required to derive the relational expression of the plurality of parameters can be reduced.

As described above, according to the information processing device of the second embodiment, the reflection of the relevance between the numerical data and the position information in the processing for the image data can be easily reflected by the information processing device that performs the processing.

Third Embodiment

Figure 23:
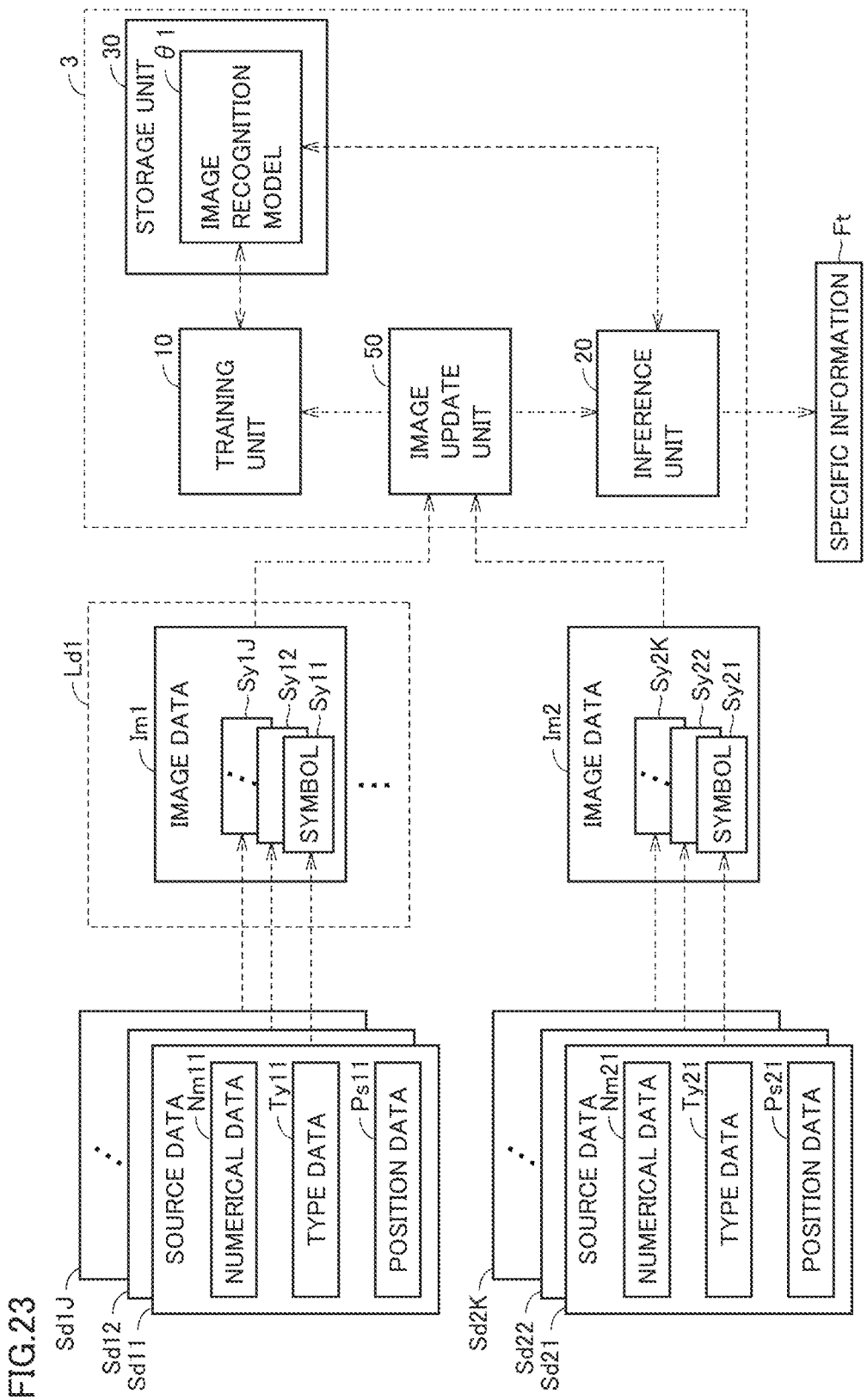
FIG. 23 is a block diagram illustrating a functional configuration of an information processing device according to a third embodiment.

A configuration improving recognition accuracy of an image recognition model for the symbol included in the image data by updating the image data will be described in a third embodiment. FIG. 23 is a block diagram illustrating a functional configuration of an information processing device 3 according to the third embodiment. The functional configuration of information processing device 3 is a functional configuration in which an image update unit 50 is added to information processing device 1 in FIG. 1. Because other functional configurations of information processing device 3 are similar to those of information processing device 1, the description of the functional configurations will not be repeated.

As illustrated in FIG. 23, image data Im1, Im2 are input to image update unit 50. Image update unit 50 updates image data Im1, Im2, and outputs updated image data Im1, Im2 respectively to training unit 10 and inference unit 20.

Figure 24:
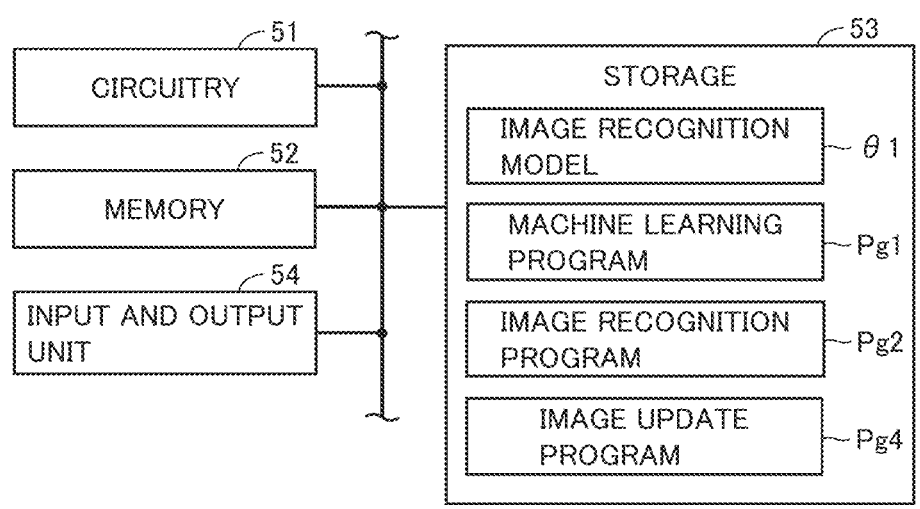
FIG. 24 is a block diagram illustrating a hardware configuration of the information processing device in FIG. 23.

FIG. 24 is a block diagram illustrating a hardware configuration of information processing device 3 in FIG. 23. The hardware configuration of information processing device 3 is a configuration in which an image update program Pg4 is added to storage 53 in FIG. 7. Because the hardware configuration of information processing device 3 other than this is similar to that of information processing device 1, the description thereof will not be repeated. As illustrated in FIG. 24, image update program Pg4 is a program that updates the image data. Circuitry 51 that executes image update program Pg4 functions as image update unit 50 in FIG. 23.

Update processing of an input signal (image data) by noise superimposition performed by image update unit 50 in FIG. 23 will be described below.

When image recognition model θ1 includes a convolutional neural network, the image data input to image recognition model θ1 is updated by a determinant (weighting matrix) configuring a filter of each layer of the convolutional neural network. However, at the time of training, image recognition model θ1 trained from another image recognition model may be configured by performing transfer learning on another image recognition model obtained by training using training data similar to training data Ld1. Using the transfer learning, training cost can be decreased as compared with the case where untrained image recognition model θ1 is made into the trained model.

Assuming that the signal (image data) input to image recognition model θ1 is s, signal s is expressed as a three-dimensional tensor matrix when the symbol included in signal s corresponds to the numerical data regarding the object disposed in a three-dimensional structure. When the symbol corresponds to the numerical data related to the object disposed on the two-dimensional plane, signal s is expressed as a vector matrix. When the symbol corresponds to the numerical data related to the object disposed on the straight line, signal s is expressed as a scalar matrix. Signal s may be expressed as a multi-dimensional matrix at least four dimensions. In addition, the output (target value y) of image recognition model θ1 may also be any of a scalar matrix, a vector matrix, and a tensor matrix. For example, in the deep learning, the output having any structure can be generated by changing the function of the hidden layer immediately before the output layer.

A sign function is defined as sign in the following expression (1).

[Mathematical formula 1]

$$\text{sign}(s) = \begin{cases} \dfrac{s}{|s|} : s \neq 0 \\ 0 : s = 0 \end{cases} \quad (1)$$

An arbitrary loss function such as a square sum error or cross entropy is denoted by L, and a minute amount to be changed is denoted by ε. Signal s is updated as in the following equation (2). In the equation (2), an update signal in a direction (opposite sign) opposite to the changing direction (the sign of the inclination) of loss function L is added to signal s.

[Mathematical formula 2]

$$s \leftarrow s - \varepsilon \cdot \text{sign}\left\{\frac{\partial}{\partial s} L(\theta, s, y)\right\} \quad (2)$$

Furthermore, in a technology called adversarial attack, signal s is updated as in the following equation (3). In the equation (3), signal s is added, and in the equation (3), the update signal (noise) in the same direction (same sign) as the change direction of loss function L is added to signal s. The object of the adversarial attack is to ensure robustness of image recognition model θ1 against the noise.

[Mathematical formula 3]

$$s \leftarrow s - \varepsilon \cdot \text{sign}\left\{\frac{\partial}{\partial s} L(\theta, s, y)\right\} \quad (3)$$

In the third embodiment, the image data is updated such that loss function L is minimized using the equation (2) inverting the sign of the inclination of loss function L, and the recognition accuracy of the image data with respect to image recognition model θ1 is improved. The method using the equation (2) is a technique of improving the accuracy of the determination result of the image recognition model by adding the noise to the data using the adversarial attack (a method for adding the noise to the data to make a mistake in the determination result of the image recognition model) in the reverse direction. Accordingly, the method using the equation (2) is defined as friendly attack.

Figure 25:
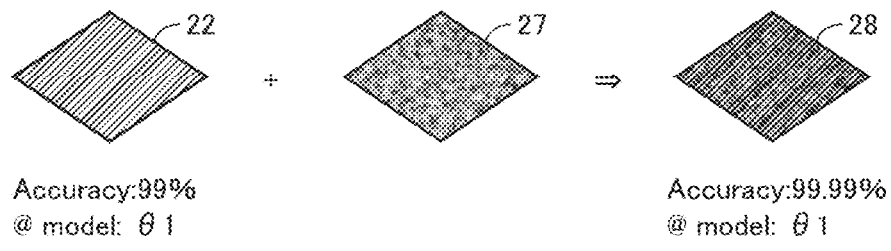
FIG. 25 is a view schematically illustrating a state in which a signal input to an image recognition model is updated by an update signal.

FIG. 25 is a view schematically illustrating a state in which signal s input to image recognition model θ1 using the friendly attack is updated by update signal ds. As illustrated in FIG. 25, image data 27 corresponding to noise ds is superimposed on image data 22 corresponding to signal s, whereby signal s is updated to a signal corresponding to image data 28.

Figure 26:
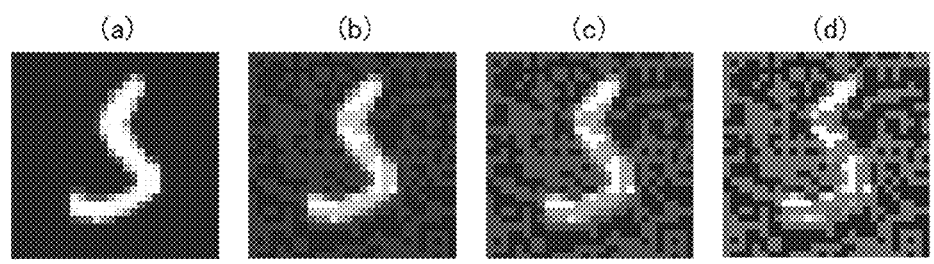
FIG. 26 is a view illustrating a state in which image data of MNIST that is a classification problem of handwritten numbers is updated.

FIG. 26 is a view illustrating a state in which the image data of modified national institute of standards and technology (MNIST), which is a classification problem of handwritten numbers, is updated by the equation (2). Four image data (a), (b), (c), (d) in FIG. 26 represent the number 5. The following table 2 illustrates the number of trial times of the update processing for adding the noise performed on each of image data (a), (b), (c), (d), the accuracy with which the image data is recognized as 3, and the correspondence of the accuracy with which the image data is recognized as 5.

TABLE 2

| Number of trials | 0 | 20 | 40 | 60 |
|---|---|---|---|---|
| Accuracy recognized as 3 | 99.45% | 0.003% | 0% <1e−7% | 0% <1e−12% |
| Accuracy recognized as 5 | 0.05% | 98.80% | 99.46% | 99.98% |

As illustrated in Table 2, when the noise is added to image data (a) having the accuracy of 0.05% at which the image data is recognized as 5, it is possible to improve the accuracy at which the image data is recognized as 5 can be improved in accordance with the increase in the number of trial times of the update processing. The accuracy with which image data (d) of which the number of trial times of the update process is 60 is recognized as 5 is 99.98%. The convolutional neural network to which the image data in FIG. 26 is input includes three hidden layers. According to the convolutional neural network, the calculation time required for the image recognition is less than or equal to 3 seconds per symbol according to a general-purpose personal computer (PC) not equipped with dedicated hardware such as a GPU. In a relatively small model in which the number of hidden layers of about 3 layers, image recognition of one symbol can be calculated in about 10 seconds even with a smartphone or the like. Furthermore, unlike handwritten characters having relatively high ambiguity in distinguishing shapes, the symbol having relatively low ambiguity in distinguishing shapes such as circles or squares is used in the third embodiment, so that the update processing can be started from the state in which the initial value of the recognition accuracy of trained image recognition model θ1 is as high as about 99%. Consequently, the image data with the recognition accuracy greater than or equal to 99.999% can be generated by the above update processing.

In addition, the recognition accuracy of image recognition model θ1 for the symbol can be improved by disposing the symbol updated as described above in the image data illustrated in the first embodiment. Furthermore, when the convolutional neural network is used as image recognition model θ1 in the information processing device that processes the image data, the size of the filter in the layer closest to at least the input layer of the convolutional neural network is desirably smaller than the number of pixels included in the symbol to be recognized.

Arbitrary image data can be recognized as a key using the update processing for superimposing the noise on the image data. For example, a previously-trained image recognition model is subjected to transfer learning based on different image data designated for each user (user) to generate a trained image recognition model having different properties for each user. Thereafter, the image data desired to be the key by the user is trained with respect to the image recognition model, and the noise is superimposed on the image data, so that the key can be generated by the image data that can be recognized only by the user with high accuracy (for example, detection accuracy greater than or equal to 99.99%). Because the transfer learning and the friendly attack performed in the third embodiment have a relatively small calculation cost, the image data is not required to be sent to a cloud environment in which a high-performance computer is disposed, and even the computer such as a mobile terminal (for example, a smartphone) can generate the key in real time. As a result, the key superior to a conventional key also in terms of security can be generated.

In the above description, the case where the image data generated by the friendly attack of the image recognition model is used as the key while the image recognition model generated for each user is used as a key hole has been described. However, the image recognition model may be used as the key, and the image data may be used as the key hole. That is, in the former case, a weight matrix serving as the image recognition model is held in the information processing device, and the key is released when the information processing device recognizes the desired image data. On the other hand, in the latter case, the image data is held in the information processing device, and the information processing device having the weight matrix serving as the image recognition model releases the key when recognizing the image data. However, in the case of using the neural network, because it is difficult to set the recognition accuracy of the image data to 100%, and for example, desirably the threshold value according to the environment is set, such as setting the recognition accuracy greater than or equal to 99.99%, or setting the recognition accuracy greater than or equal to 99% in a place where dirt is likely to adhere. In particular, in the place where the dirt is likely to adhere, desirably the image data including the image of the dirt in the training data of the image recognition model is included, or the robust image data resistant to the noise such as the dirt by the adversarial attack is generated.

As described above, according to the information processing device of the third embodiment, the reflection of the relevance between the numerical data and the position information in the processing for the image data can be easily implemented by the information processing device that performs the processing.

Fourth Embodiment

A configuration that improves recognition accuracy of an image recognition model for the symbol included in the image data will be described in a fourth embodiment. Because an information processing device of the fourth embodiment is similar to information processing device 1 in FIG. 1, the description of the similar configuration will not be repeated. A configuration of the characteristic symbol in the fourth embodiment will be described below.

Figure 27:
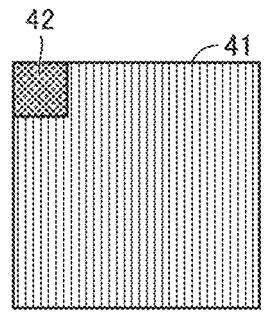
FIG. 27 is a view illustrating a configuration of a symbol that is an example of a symbol according to a fourth embodiment.

FIG. 27 is a view illustrating a configuration of a symbol 41 that is an example of the symbol according to the fourth embodiment. As illustrated in FIG. 27, a sub-symbol 42 grasping the size of symbol 41, the fineness of the dot of symbol 41, or the direction of symbol 41 is added inside symbol 41. A plurality of sub-symbols 42 may be added inside symbol 41. The machine learning is not required to be used to determine at least one sub-symbol 42 in symbol 41. For example, information about the sub-symbol may be acquired by the image processing device such as a quick response (QR) code reader, and the information may be input to the information processing device using the trained image recognition model. The information processing device can specify information about the size or the orientation of the filter (or kernel) in the convolutional neural network from the information. In particular, the correction of the orientation, the filter size in the pooling, the size of the filter, the orientation in which the filter is convoluted, or the like is specified. The position of sub-symbol 42 is not required to be any of four corners of symbol 41. When symbol 41 is a two-dimensional image, the determination including the inclination of symbol 41 can be performed by disposing sub-symbol 42 at at least two locations of symbol 41. As a result, the recognition accuracy of the information processing device to which the image data including symbol 41 is input can be improved. Furthermore, in the image data in which an N (≥3)-dimensional space is represented, in order to clarify the region of symbol 41, desirably the plurality of sub-symbols 42 are disposed at at least N locations, and more desirably the plurality of sub-symbols 42 are disposed at at least (N+1) locations. As a result, the recognition accuracy of the information processing device can be improved.

In addition, the orientation of symbol 41 is indicated by sub-symbol 42, so that the plurality of symbols (for example, an upward-pointing triangular symbol and a downward-pointing triangular symbol) having the same shape and different orientations can be disposed in one image data in association with different types of numerical data, respectively. As a result, the symbol having high recognition accuracy of image recognition model θ1 can be generated by changing the direction of the symbol having the same shape as the symbol without increasing the shape, the hatching, or the color.

Figure 28:
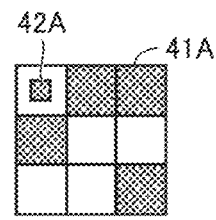
FIG. 28 is a view illustrating a configuration of a symbol that is another example of the symbol according to the fourth embodiment.

FIG. 28 is a view illustrating a configuration of a symbol 41A that is another example of the symbol according to the fourth embodiment. As illustrated in FIG. 28, symbol 41A is configured as a combination of a plurality of dots. A sub-symbol 42A may be disposed in a dot Dt1 included in symbol 41A. For example, when symbol 41A includes p×q (p, q are positive integers) dots, a tile (quadrangle) having a size of 1/p×1/q in a certain dot is disposed as sub-symbol 42A at the center of the dot, so that the size or the direction of symbol 41A can be indicated. The shape of the symbol configured as the combination of the plurality of dots is not necessarily square, but may be any shape such as a rectangle or a rhombus. Furthermore, the combination of the plurality of dots is not required to have a lattice shape at equal intervals, but may be any combination as long as the combination has the size and the shape determined by a rule using four arithmetic operations in which logarithms, exponents, and the like are combined.

As described above, according to the information processing device of the fourth embodiment, the reflection of the relevance between the numerical data and the position information in the processing for the image data can be easily implemented by the information processing device that performs the processing.

Fifth Embodiment

Figure 29:
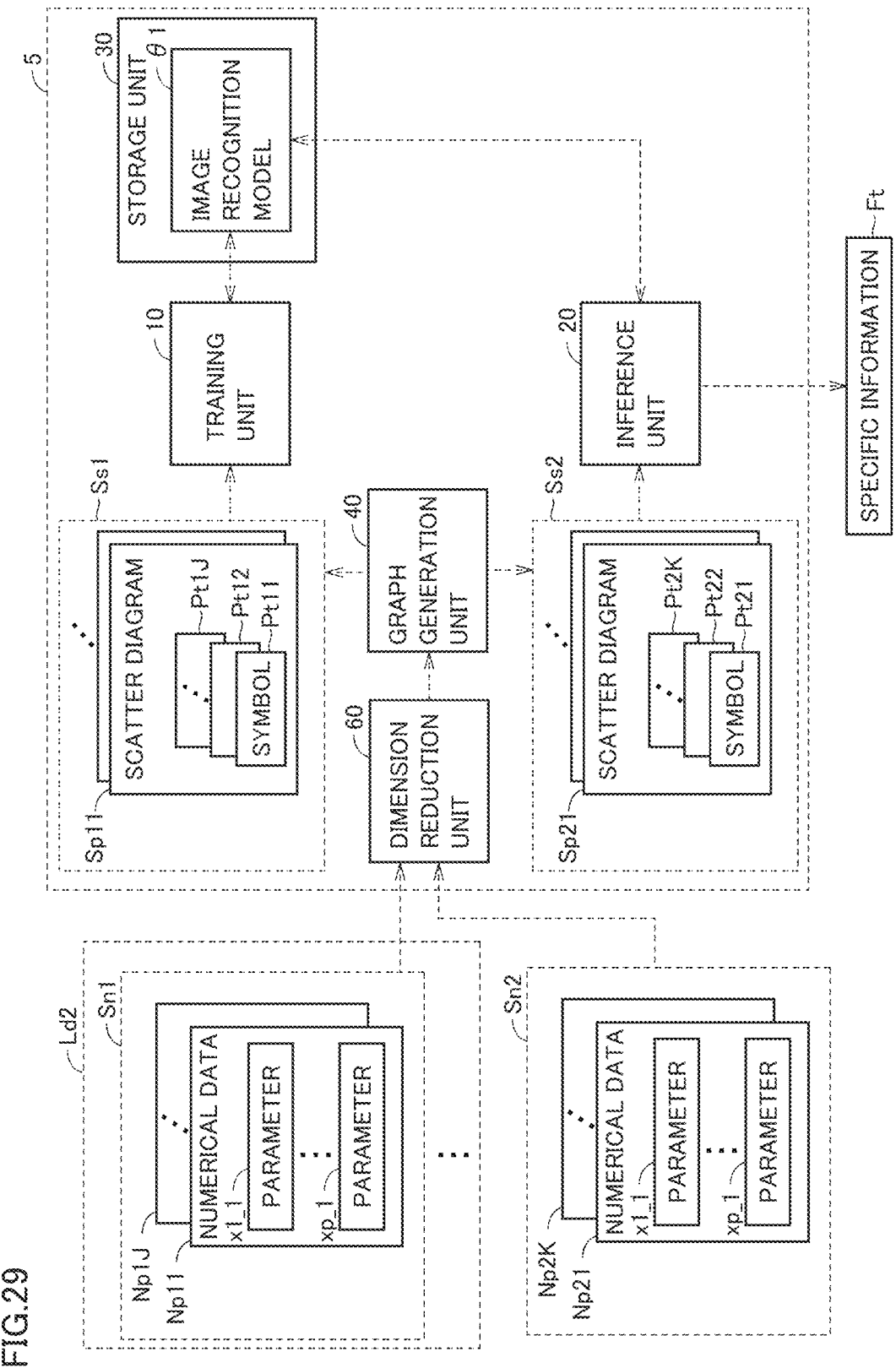
FIG. 29 is a block diagram illustrating a functional configuration of an information processing device according to a fifth embodiment.

A configuration in which a parameter having a relatively low relation with the objective variable is reduced from a plurality of parameters included in a numerical parameter to speed up training processing and inference processing will be described in a fifth embodiment. FIG. 29 is a block diagram illustrating a functional configuration of an information processing device 5 according to the fifth embodiment. The functional configuration of information processing device 5 is a functional configuration in which a dimension reduction unit 60 is added to information processing device 2 in FIG. 12. Because other functional configurations of information processing device 5 are similar to those of information processing device 2, the description of the functional configurations will not be repeated.

As illustrated in FIG. 29, numerical data sets Sn1, Sn2 are input to dimension reduction unit 60. Dimension reduction unit 60 reduces the dimensions of each of the plurality of numerical data included in numerical data sets Sn1, Sn2 and outputs the data to graph generation unit 40. The number of dimensions of the numerical data in FIG. 29 is p.

Figure 30:
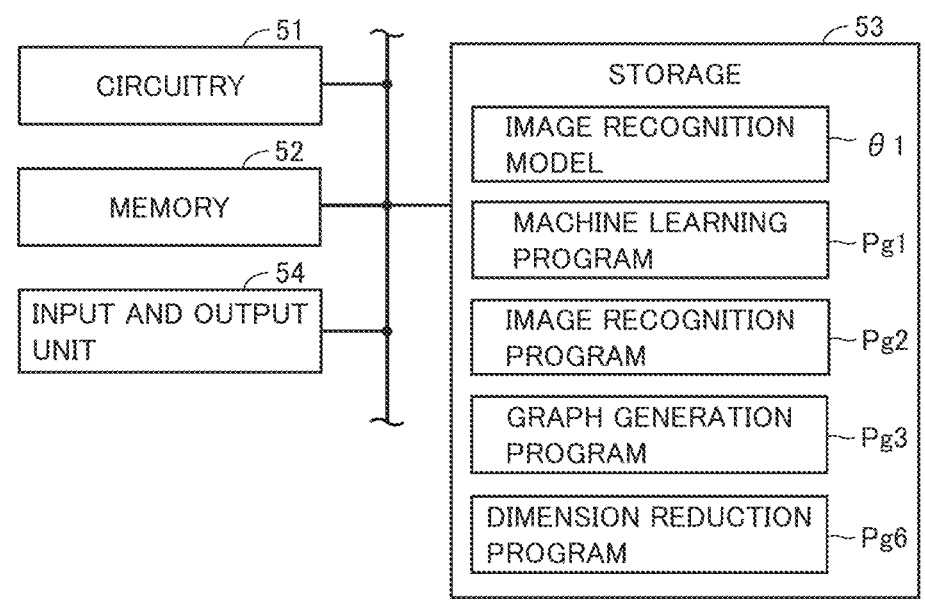
FIG. 30 is a block diagram illustrating a hardware configuration of the information processing device in FIG. 29.

FIG. 30 is a block diagram illustrating a hardware configuration of information processing device 5 in FIG. 29. The hardware configuration of information processing device 5 is a configuration in which a dimension reduction program Pg6 is added to storage 53 in FIG. 13. Because other hardware configurations of information processing device 5 are similar to those of information processing device 1, the description thereof will not be repeated. As illustrated in FIG. 30, dimension reduction program Pg6 is a program that reduces the dimensions of the numerical data. Circuitry 51 that executes dimension reduction program Pg6 functions as dimension reduction unit 60 in FIG. 29.

Characteristic parameter deletion (dimension reduction) processing in the fifth embodiment will be described below.

When the plurality of parameters included in the numerical data are relatively large, it takes a lot of time to generate the scatter diagram of all combinations of the plurality of parameters. For example, even the image data of the MNIST having a relatively small amount of data has 784 (=28×28) pixels. For this reason, when the image data of the MNIST is regarded as the numerical data having the plurality of parameters, the numerical data has 784 parameters. However, because the pixel near the four corners of the image data has almost no information, there is almost no relationship between the pixel and the objective variable (correct answer label) in many cases. Consequently, even when the parameter having a low relationship with the objective variable is deleted from the parameters included in the numerical data, the objective variable can be maintained. Similarly, the unnecessary parameter can be deleted for the numerical data other than the image data. As a result, the training processing and the inference processing executed by the information processing device of the fifth embodiment can be made faster than those of the information processing device of the second embodiment.

Examples of the parameter that can be deleted from the numerical data include the parameter in which the correct answer label does not change even when the value is changed and the parameter that does not depend on the correct answer label. In the case where the correct answer label does not change even when the parameter value is changed, the points are distributed along the straight line parallel to the axis indicating the parameter in the scatter diagram indicating the relationship between the parameter and the objective variable. The case where the parameter does not depend on the correct answer label is the case where the uniform distribution is recognized in the scatter diagram indicating the relationship between the parameter and the correct answer label, such as the white noise. In the scatter diagram illustrating the relationship between a certain parameter and the correct answer label, when the distribution mode of the points is as described above, the parameter can be deleted from the numerical data. Furthermore, when the requirement of the parameter cannot be determined from the distribution mode of the points in the scatter diagram, cross-correlation between the parameter and the correct answer label can be calculated to remove the parameter having the small correlation. Furthermore, when the parameter is the analog value (continuous amount), a perturbation method may be performed using the training model that is trained by the machine learning including the deep learning. On the other hand, when the parameter includes a digital value (discontinuous amount), desirably other parameters are distributed for each digital value and the perturbation method is performed for each parameter. For example, when the parameter has digital values of 1, 2, 3, 4, the perturbation method may be performed in each case where the parameter is 1, the parameter is 2, the parameter is 3, and the parameter is 4. That is, a fluctuation of the objective variable that is the output of the training model with respect to a fluctuation of the parameter input to the training model is observed, and the parameter having a relatively small fluctuation of the objective variable may be removed from the numerical data.

In this way, in information processing device 5, the scatter diagram is generated after unnecessary parameters are removed from the numerical data, and the relational expression is calculated from the scatter diagram. After the relational expression is calculated from the scatter diagram of the parameters as the main constituent that is not removed, the relational expression may be updated using the parameters that is removed once to improve the accuracy of the relational expression. For example, the constituent of the relational expression generated from the parameter of the main constituent may be subtracted from the target value, and a new relational expression may be calculated using the remaining residual constituent and the removed parameter. In this case, because the error is accumulated in the residual due to the error of the constant of the main constituent, it is not necessary to use the residual constituent is not required to be used when the parameter is large to lower the accuracy of the relational expression.

As described above, for the parameter in which the requirement cannot be determined from the distribution mode of the scatter diagram, the parameter can be deleted using the machine learning. In the method for determining the requirement using the scatter diagram, after unnecessary parameters having the small influence on the determination of the target value are removed, the training is performed by the machine learning algorithm capable of training the parameters for remaining parameters. The unnecessary parameter is deleted, so that the calculation time of the machine learning can be shortened. Using the result of the machine learning, the degree of influence of each parameter on the result can be calculated by the perturbation method. The perturbation method is a method for observing the change in a target value when an input parameter changes. Specifically, the numerical value near the training data is input to the trained training model, and the change amount of the target value is observed.

In the following, the deletion of the parameter will be described using the following equation (4) representing an energy conservation law of the object connected to an end of a spring as an example.

[Mathematical formula 4]

$$E = \frac{1}{2}mv^2 + mgh + \frac{1}{2}kx^2 \quad (4)$$

In the equation (4), E represents energy of the object. m represents mass of the object. v represents a velocity of the object. g represents gravitational acceleration. h represents a height of the object. k represents a spring constant. x represents displacement of the spring. Energy E is the objective variable. Mass m, velocity v, gravitational acceleration g, height h, spring constant k, and displacement x are parameters (explanatory variables). Gravitational acceleration g not regarding energy E in the classification according to the scatter diagram is excluded from the parameter. Thereafter, feature importance of each of mass m, velocity v, height h, spring constant k, and displacement x in the decision tree is calculated by the gradient boosting method. Table 3 illustrates the feature importance of each of mass m, velocity v, height h, spring constant k, and displacement x.

TABLE 3

| Feature value | Feature importance |
|---|---|
| x | 668 |
| v | 648 |
| m | 542 |
| k | 488 |
| h | 181 |

The feature importance indicates the number of times used in the decision tree to determine the objective variable. Gravitational acceleration g that is a constant has a relatively small degree of influence on the result. On the other hand, displacement x and velocity v have substantially the same feature importance as illustrated in Table 3. In addition, because displacement x and velocity v are squared in the equation (4), displacement x and velocity v has the greater influence on target variable E than other parameters. In this manner, the degree of influence on the target variable or the feature importance for each of the parameters is calculated, and the unnecessary parameter such as gravitational acceleration g is reduced, so that the calculation time required to derive the relational expression regarding the scatter diagram can be reduced. For example, when there are n parameters, the required scatter diagram increases on the order of $O(n^2)$, so that n $(=n\{n+1\}/2-\{n(n-1)\}/2)$ scatter diagrams can be reduced by reducing one parameter.

Although the case of using the decision tree has been described above, sometimes the case where permutation importance by rearrangement is used in another machine learning. In addition, the perturbation method for changing an input value by one parameter to measure the change amount of the objective variable may be used. When the parameter amount in the case of using the perturbation method is the analog value, the difference between the maximum value and the minimum value of the analog value is desirably less than or equal to 1% of the maximum value in the change amount. When the parameter amount is the digital value, a value close to the original data, such as an adjacent value (for example, N−1 and N+1 when the parameter is an integer value N), is desirably set as the input value of the perturbation method.

After performing weighting representing the importance of each parameter with respect to the objective variable as described above, the number of parameters to be reduced may be changed in light of the available calculation resource or calculation time. When the calculation resource is relatively small, or when the calculation time until the result is desired to be calculated, energy E can be determined using displacement x and velocity v, which are proportional to the square in the example of the above energy conservation law and are the main parameters. In a general computer, desirably the number of parameters is reduced to about the top 10 items of ranking of the importance weighting.

On the other hand, when no correlation is recognized between the objective variable and the parameter, or when similar correlation is recognized between all the parameters and the objective variable, it is considered that the parameter required for the objective variable is not input. In this case, the parameter (for example, measurement condition) is required to be reviewed. In addition, when any parameter has a similar numerical value, there is a possibility that a strong correlation exists between the parameter and the objective variable. In this case, the objective variable and the plurality of parameters become data having a strong dependence relationship from the scatter diagram or the cross-correlation between the parameters. Consequently, the weighting indicating the importance of each parameter with respect to the objective variable can also be used for improving a parameter measurement method such as reduction of the number of observation points. This cannot be determined only by the conventional cross-correlation, but a highly accurate result can be predicted by the algorithm using the scatter diagram or the machine learning.

In the above description, the feature importance or the importance determination by the rearrangement, and the method for reducing the parameter (dimension reduction) from the perturbation method have been described. The dimension reduction may be performed by combining principal component analysis (PCA), singular value decomposition (SVD), independent component analysis (ICA), linear discriminant analysis (SDA), and the like. In addition, a method in which these techniques and importance determination by the rearrangement are combined may be used. However, all of the above calculations are relatively large in the calculation amount. Consequently, when the numerical data is big data including a very large number of parameters, and processing for removing the unnecessary parameter is performed by performing the calculation using the scatter diagram before performing the above calculation, the parameters can be reduced without performing significant calculation. In addition, when the numerical data is relatively small data, the feature of the numerical data can be grasped without causing over-training using the contour line or the histograms. For example, when at least 1,000 data cannot be collected as in a physical experiment, a method using the contour line capable of expressing a possible distribution or density of data or a histogram capable of expressing a rough distribution of data is effective.

As described above, according to the information processing device of the fifth embodiment, the reflection of the relevance between the numerical data and the position information in the processing for the image data can be easily implemented by the information processing device that performs the processing.

Sixth Embodiment

A utilization example of a relational expression calculated from image data such as a scatter diagram will be described in a sixth embodiment. In simulation conditions requiring a relatively long calculation time for one condition, experiments, or simulation conditions with a large number of parameters, it is often difficult to determine which parameter is required to be preferentially calculated according to the conventional method. In such the case, a Monte Carlo method or a method for performing the calculation while uniformly dispersing all parameters at equal intervals is often used. In order to prevent such exhaustive calculation, a method of reducing the number of parameters using a genetic algorithm or the like may be used. However, this method not only has a large calculation amount, but also has an unclear basis for determination. For this reason, when the design that requires the basis, such as the physical phenomenon, is required, the reduction of the number of parameters using the genetic algorithm or the like is not suitable.

On the other hand, in the sixth embodiment, the next simulation condition can be easily determined by calculating the relational expression between the simulation result and the parameter regarding the simulation condition for each simulation or several simulations from the combination of the simulation condition and the simulation result. For example, it is assumed that the relational expression expressed as the following expression (5) is derived by the configurations described in the second and fifth embodiments.

[Mathematical formula 5]

$$P = \frac{1}{3}z^2 - \frac{1}{4}\sqrt{u} + 5 \qquad (5)$$

In the equation (5), P is the objective variable. z is a position parameter. u is a material parameter. In the equation (5), the square value of position parameter z and the square root of material parameter u are used in deriving target variable P. Therefore, desired target variable P can be efficiently reached by observing position parameter z rather than material parameter u and observing material parameter u at the stage of fine adjustment with respect to target variable P. In addition, when the simulation is performed under the simulation condition similar to another simulation condition, the simulation condition under which the desired objective variable is output by the simulation performed a smaller number of times than usual can be reached by grasping previously the relational expression such as the equation (5) corresponding to the another simulation condition. In this way, not only the knowledge obtained from the simulation result can be left as the relational expression, but also the relational expression is not required to be calculated for each simulation using the same relational expression for similar design, so that the simulation condition that can set the objective variable to a desired value can be found at high speed.

When a new simulation condition is added to the conventional method such as the genetic algorithm, the simulation result so far cannot be reused, and there is a problem that the relational expression is required to be recalculated. Accordingly, because the inverse problem is generated, the calculation cost for each simulation tends to increase. On the other hand, in the scatter diagram training method of the sixth embodiment, the arithmetic operation can be performed only by inference to reuse the image recognition model, and the derivation of the relational expression by the image recognition model can be completed within several seconds to several minutes. The training processing can also be used to determine the next parameter during the simulation or the experiment, and extract the simulation condition or the observation condition of the experiment that can set the objective variable to the desired value after the end of the simulation or the experiment.

In addition, the training method of the sixth embodiment can be applied to not only the experiment or the simulation, but also any configuration as long as the configuration is a configuration in which the result under a certain condition such as setting of a product price or evaluation of a product is derived, or a configuration in which the relationship between the input and the output such as machine failure prediction or human behavior prediction that changes according to the lapse of time is defined. In particular, time-series data regarding the configuration that changes with the lapse of time can be converted into the two-dimensional image data by converting the time-series data into a spectrogram in which the horizontal axis is time and the vertical axis is the frequency feature by short time Fourier transform. Using the image data instead of the scatter diagram, the relational expression regarding the spectrogram can be derived by processing similar to the processing for the scatter diagram. However, unlike the case of the scatter diagram, image recognition model θ1 is required to be cause to learn previously the spectrogram. In addition, even in the case of the image data of the first embodiment, the relational expression regarding the image data can be derived by disposing the numerical data as the symbol in the image data. For example, in board CAD (Computer-Aided Design), a circuit constant or ID of the circuit component is disposed in the board CAD as the symbol, the board CAD is input to an electromagnetic field simulation, and a simulation result is used as teacher data, whereby the relational expression corresponding to the relationship between the CAD and the simulation result can be derived.

In the machine learning, sometimes it takes a lot of time to tune hyperparameters. The accuracy of image recognition model θ1 for each hyperparameter is calculated and the relational expression is derived using the accuracy, speed-up of the hyperparameter tuning can be implemented. The relational expression may be calculated by sequential calculation. The relational expression is calculated after all the calculations are completed, and the hyperparameter optimal for each machine learning is easily calculated using the relational expression at another training timing. In addition, the relationship between the hyperparameters can also be grasped by the relational expression, so that the hyperparameter can be calculated using the relational expression. As a result, when a similar algorithm is used for similar data, the hyperparameter that is not required to be changed is removed, and the hyperparameter that is required to be preferentially changed is extracted, so that design efficiency after the second trial can be improved.

As described above, according to the information processing device of the sixth embodiment, the reflection of the relevance between the numerical data and the position information in the processing for the image data can be easily implemented by the information processing device that performs the processing.

Seventh Embodiment

Figure 31:
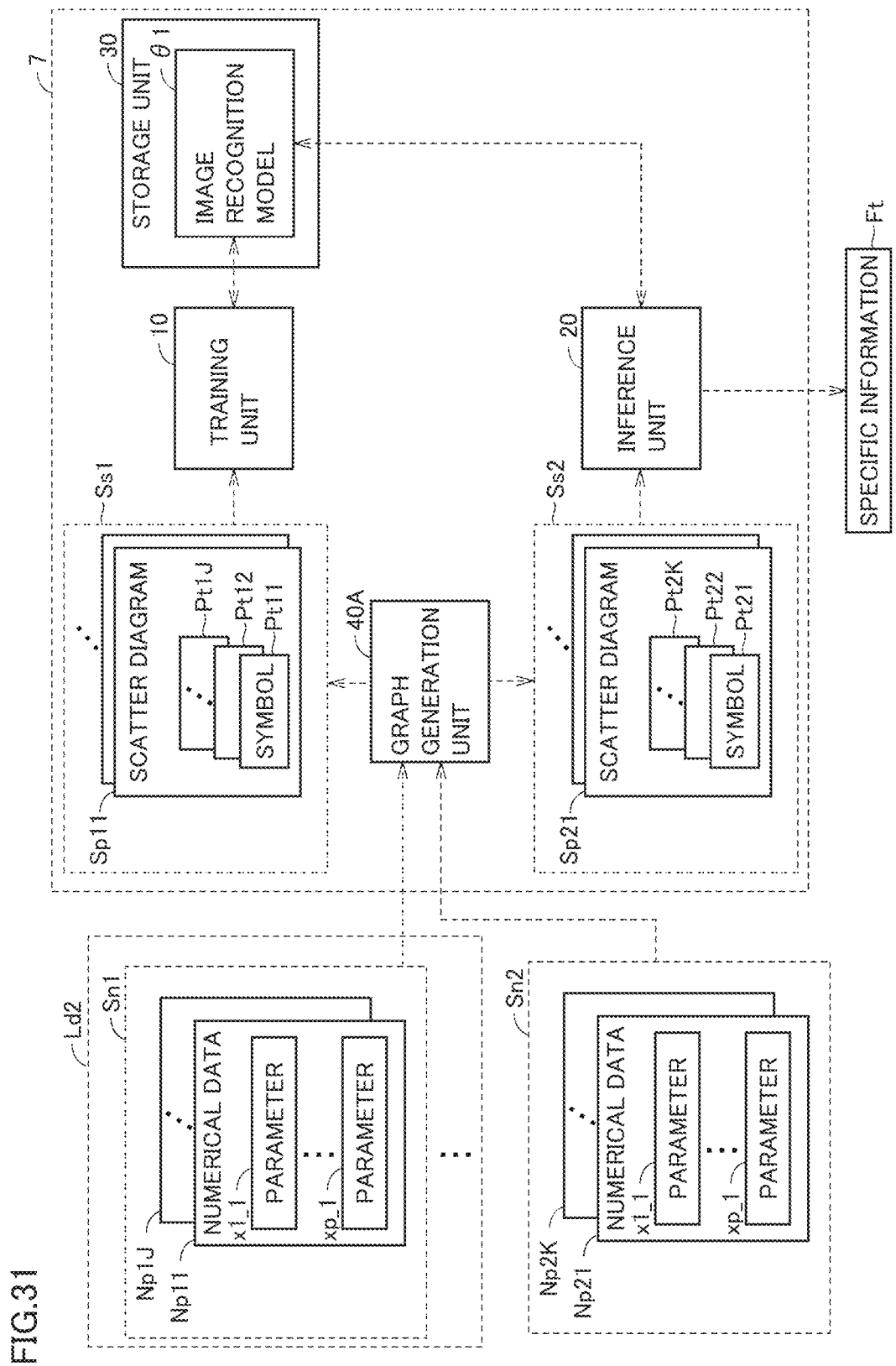
FIG. 31 is a block diagram illustrating a functional configuration of an information processing device according to a seventh embodiment.

A configuration in which when the distribution of the scatter diagram described in the second embodiment is biased, the distribution is converted into a uniform distribution will be described in a seventh embodiment. FIG. 31 is a block diagram illustrating a functional configuration of an information processing device 7 according to the seventh embodiment. The functional configuration of information processing device 7 is a configuration in which graph generation unit 40 in FIG. 12 is replaced with a graph generation unit 40A. Because other functional configurations of information processing device 7 are similar to those of information processing device 2, the description of the functional configurations will not be repeated.

As illustrated in FIG. 31, graph generation unit 40A generates scatter diagram set Ss1 including scatter diagram Sp11 representing the uniform distribution obtained by uniformizing the distribution of the plurality of numerical data included in numerical data set Sn1, and outputs scatter diagram set Ss1 to training unit 10. Graph generation unit 40A generates scatter diagram set Ss2 including scatter diagram Sp21 representing the uniform distribution in which the distribution of the plurality of numerical data included in numerical data set Sn2 is uniformized, and outputs scatter diagram set Ss2 to inference unit 20.

Figure 32:
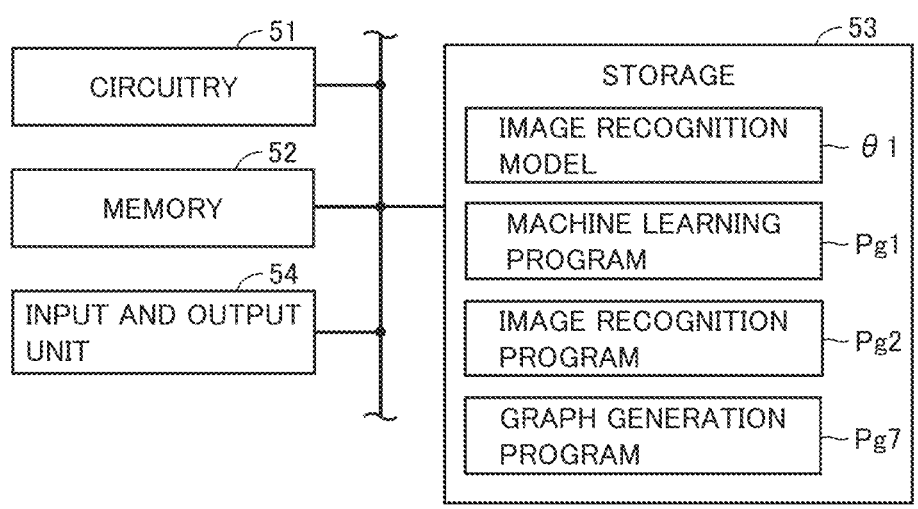
FIG. 32 is a block diagram illustrating a hardware configuration of the information processing device in FIG. 31.

FIG. 32 is a block diagram illustrating a hardware configuration of information processing device 7 in FIG. 31. The hardware configuration of information processing device 7 is a configuration in which graph generation program Pg3 in FIG. 13 is replaced with a graph generation program Pg7. Because the hardware configuration of information processing device 7 other than this is similar to that of information processing device 2, the description thereof will not be repeated. As illustrated in FIG. 32, graph generation program Pg7 is a program that receives the numerical data set and generates the scatter diagram set including a plurality of uniform distributions generated from the plurality of numerical data included in the numerical data set. Circuitry 51 that executes graph generation program Pg7 functions as graph generation unit 40A in FIG. 31.

Uniform distribution generation processing performed by graph generation unit 40A will be described below.

The scatter diagram obtained in the configuration for a natural phenomenon such as a physical experiment often has a unique distribution that is not the normal distribution (Gaussian distribution) or a unique distribution that is not the uniform distribution. In addition, with respect to the parameter serving as the measurement condition, because the region where the most desired feature is obtained is mainly measured in many cases by an empirical rule, the deviation may be generated in the distribution of the measurement results. Furthermore, when the data cannot be sufficiently acquired in many environments where the actual measurement or the number of trials is limited, the training processing cannot be sufficiently performed due to shortage of the training data. For example, with a small amount of data less than or equal to 100 points, it is difficult to generate the trained model having high accuracy by the deep learning. In such the case, a method using the contour line is effective instead of the scatter diagram described in the second embodiment. In particular, when the number of teacher data sets of parameters and target values (correct answer data) is less than or equal to about 1,000, the method using contour line as illustrated in FIG. 17 is effective.

On the other hand, when at least 1,000 data exist, even when the unnecessary parameter is included, the trained model capable of accurately calculating the objective variable by the conventionally known machine learning algorithm can be generated.

The machine learning algorithm in the classification problem include stochastic gradient descent (SGD), support vector machines, k-nearest neighbors (k-NN), the deep learning using a deep neural network (DNN), and gradient boosting, the decision tree. The machine learning algorithm in the regression problem includes the SGD, least absolute shrinkage and selection operator (Lasso), ElasticNet, support vector regression (SVR), gradient boosting, the deep learning, or ensemble learning that is a combination thereof. Furthermore, an average value of the results of the machine learning algorithms may be used.

Figure 33:
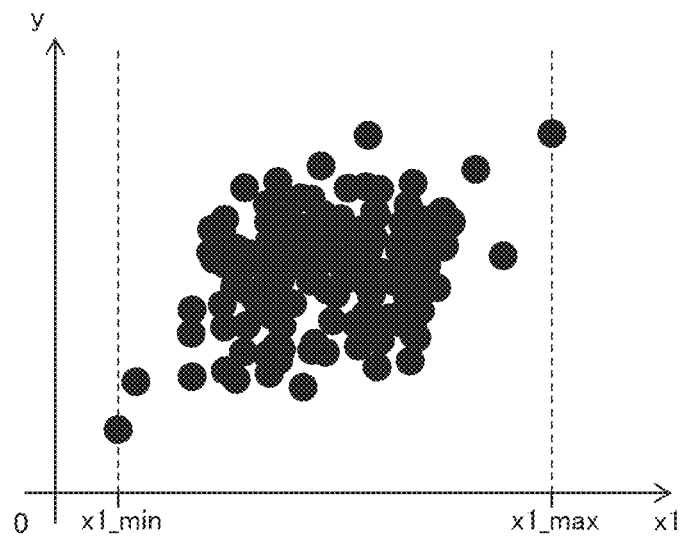
FIG. 33 is a view illustrating an example of a scatter diagram in which distribution is biased.
Figure 34:
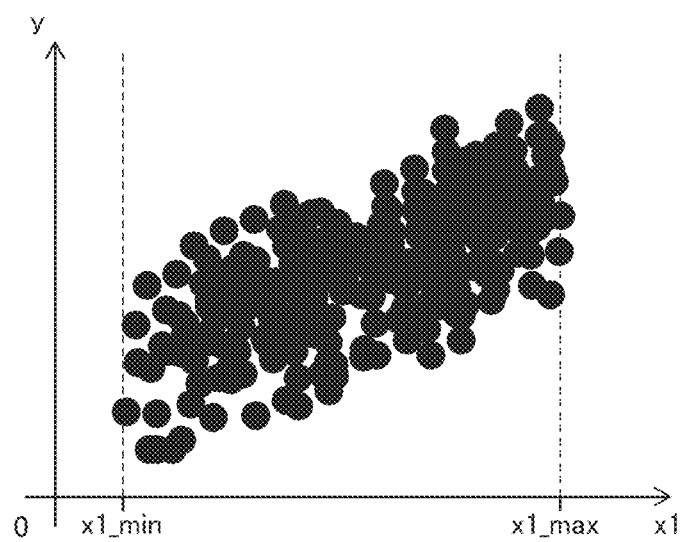
FIG. 34 is a view illustrating an example of uniform distribution.

Even in the case where at least 1,000 data exist, when there is the deviation in the distribution of the data, it is difficult to extract the parallel constituent in the scatter diagram described in the second embodiment. In general, the data on the physical phenomenon often follows a normal distribution. In such the case, the density is high around the average value of the data in the scatter diagram, and the density is low in a peripheral portion of the average value. In this case, even when the distribution of the data in the scatter diagram has the parallel feature, it is difficult to extract the parallel constituent from the distribution because the distribution approaches a circular distribution as illustrated in FIG. 33. In such the case, graph generation unit 40A performs clustering on the scatter diagram between the parameters, and divides the scatter diagram into a plurality of boundary regions. The scatter diagram may be divided into two parameters and processed. However, in the case where a memory capable of simultaneously processing the data can be secured, when M parameters and N objective variables exist, desirably the clustering is performed in an (M+N)-dimensional space at the maximum to obtain the boundary region. In addition, when the parameter includes the digital value (discontinuous discrete value), desirably the clustering for each discrete value of the parameter is performed. Furthermore, graph generation unit 40A generates the uniform distribution as illustrated in FIG. 34 for each parameter, and updates the scatter diagram by applying the uniform distribution to the clustering result (a plurality of boundary regions). Graph generation unit 40A outputs the updated scatter diagram to training unit 10 or inference unit 20.

The range of parameter x1 in the scatter diagram of FIG. 33 is greater than or equal to x1_min and less than or equal to x1_max. The range of parameter x1 in the scatter diagram of the uniform distribution in FIG. 34 is the same as the range of parameter x1 in the scatter diagram of FIG. 33. As described above, desirably the uniform distribution is generated within the range of the original data, but for the parameter in which physical continuity is confirmed, the uniform distribution having a wider range than the original data may be used in order to perform extrapolation to the original data. For example, for the parameter expected to be proportional to a certain physical quantity, such as velocity v in the energy equation illustrated in the equation (4), when the data range of velocity v is 1 m/s to 10 m/s, the range of the uniform distribution may be −10 m/s to 20 m/s. Furthermore, when the required region may be narrow, the uniform distribution of 5 m/s to 7 m/s may be generated.

The clustering described above includes support vector clustering (SVC) and the clustering using the CNN. The clustering described above may be any method as long as it is a method in which classical machine learning such as the k-means method, the deep learning, and the like are combined. Furthermore, the distance defined in the clustering includes a general Euclidean distance, a Mahalanobis distance, and a Manhattan distance.

As described above, when the number of data distributed in the scatter diagram is small, it is difficult to generate a trained model with high accuracy by the deep learning. However, when the data can be increased by the uniform distribution, the deep learning can be used. However, as a result of comparing the accuracy obtained by performing arbitrary training on the original data to evaluate the original data using a part of the test data with the accuracy obtained by performing training on the data produced by the uniform distribution to evaluate the original data using a part of the test data, desirably how to make the uniform distribution is reviewed when the accuracy of the latter is lower than the accuracy of the former by at least 10%. In particular, as described above, the data can be generated without decreasing the accuracy by narrowing the range of the uniform distribution, changing the clustering method, or changing the algorithm of the machine learning that processes the data.

However, depending on variations in data distribution, it may be difficult to perform interpolation by the above clustering. In such the case, the information processing device of the seventh embodiment can infer the relational expression capable of predicting the solution with high accuracy greater than or equal to 90% by not the deep learning but random forest, a gradient boosting method, conventional machine learning, ensemble learning, or the like. However, even when the accuracy with respect to the training data is improved, it is often due to over-training, and thus, test data is required to be previously prepared separately from the training data, or the evaluation is required to be performed using a method based on cross processing, which is similar to the conventional case. Furthermore, the ensemble learning that calculates the average or majority decision of a plurality of machine learning estimated values may be used.

As described above, according to the information processing device of the seventh embodiment, the reflection of the relevance between the numerical data and the position information in the processing for the image data can be easily implemented by the information processing device that performs the processing.

Eighth Embodiment

Figure 35:
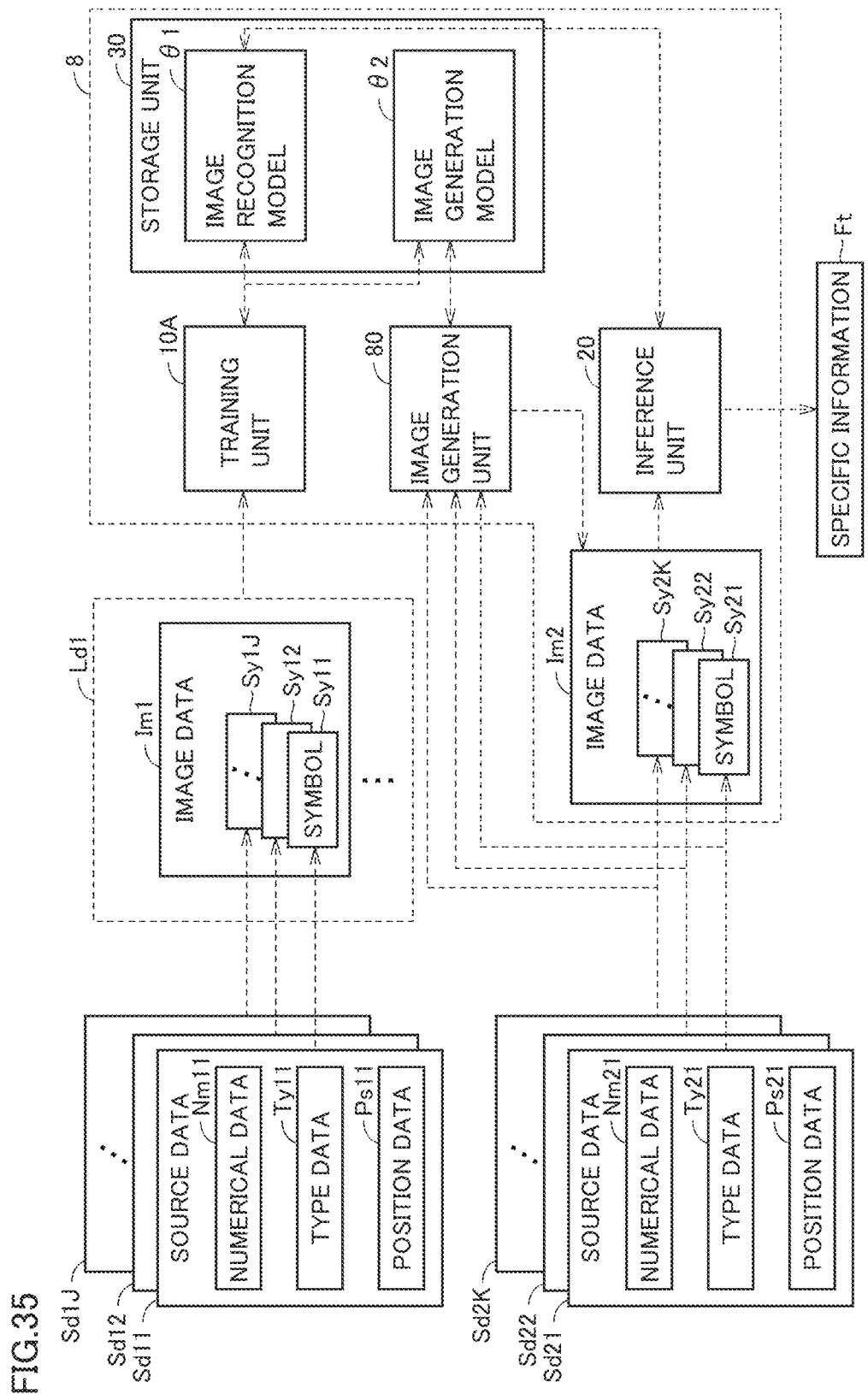
FIG. 35 is a block diagram illustrating a functional configuration of an information processing device according to an eighth embodiment.

A configuration in which the image data having the desired feature processed by the information processing device of the first embodiment is automatically generated by a generation model will be described in an eighth embodiment. FIG. 35 is a block diagram illustrating a functional configuration of an information processing device 8 according to the eighth embodiment. The functional configuration of information processing device 8 is a functional configuration in which an image generation unit 80 and image generation model θ2 are added to information processing device 1 in FIG. 1, and training unit 10 is replaced with a training unit 10A. Because other functional configurations of information processing device 8 are similar to those of information processing device 1, the description of the functional configurations will not be repeated.

Figure 36:
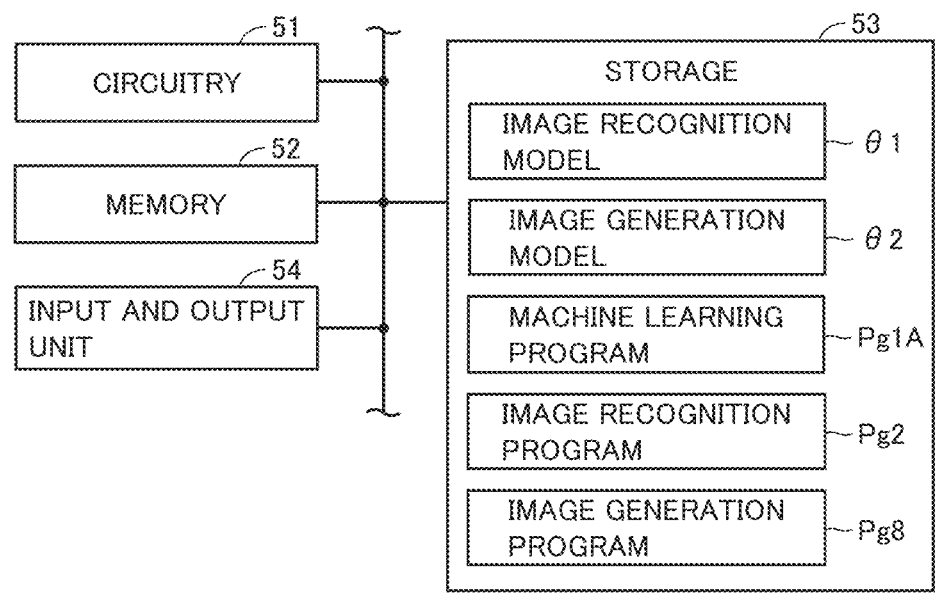
FIG. 36 is a block diagram illustrating a hardware configuration of the information processing device in FIG. 35.

As illustrated in FIG. 36, training unit 10A makes image recognition model θ1 and image generation model θ2 the trained models by the machine learning using training data Ld1 including image data Im1. Image generation unit 80 generates image data Im2 from the plurality of source data Sd21 to Sd2K using image generation model θ2, and outputs image data Im2 to inference unit 20.

FIG. 36 is a block diagram illustrating a hardware configuration of information processing device 8 in FIG. 35. The hardware configuration of information processing device 8 is a configuration in which image generation model θ2 and image generation program Pg8 are added to storage 53 in FIG. 7 and machine learning program Pg1 is replaced with a machine learning program Pg1A. Because the hardware configuration of information processing device 8 other than these is similar to that of information processing device 1, the description thereof will not be repeated. As illustrated in FIG. 36, machine learning program Pg1A is a program that performs the machine learning on image recognition model θ1 and image generation model θ2. Image generation program Pg8 is a program that generates the image data including a plurality of symbols corresponding respectively to a plurality of source data, from the plurality of source data. Image generation model θ2 is referred to in machine learning program Pg1A and image generation program Pg8. Circuitry 51 that executes machine learning program Pg1A functions as training unit 10A in FIG. 35. Circuitry 51 that executes image generation program Pg8 functions as image generation unit 80 in FIG. 35.

As image generation model θ2, for example, the image having the desired feature can be generated in the generative adversarial network that is one of application examples of the deep learning. The generative adversarial network is a configuration, in which two networks such as CNNs are simultaneously trained, one of the networks is caused to generate data (generator), and the other network (identifier) has a function of determining whether the generated data is authentic.

Figure 37:
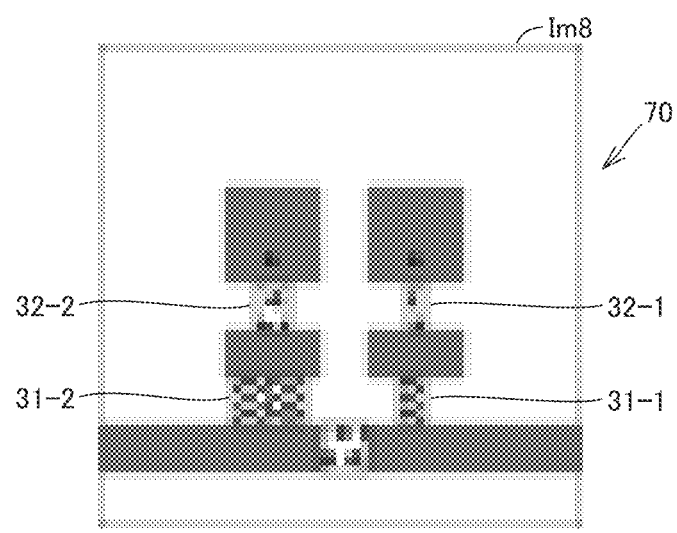
FIG. 37 is a view illustrating image data of a noise filter, which is a part of an electronic circuit, generated using the trained image generation model in FIG. 35.

FIG. 37 is a view illustrating image data Im8 of a noise filter 70, which is a part of an electronic circuit, generated using trained image generation model θ2 in FIG. 35. As illustrated in FIG. 37, noise filter 70 includes capacitors 31-1, 31-2 and coils 32-1, 32-2. The electromagnetic field analysis is calculated under 3,000 conditions in which the component constants of capacitors 31-1, 31-2 and the component constants of the coils 32-1, 32-2 are changed. Capacitors 31-1, 31-2 and coils 32-1, 32-2 are expressed by different symbols in image data Im8. The component constant of each of capacitors 31-1, 31-2 and coils 32-1, 32-2 is expressed as the size (line thickness) of the symbol corresponding to the component. Image data Im8 is the image data generated by performing the number of trials of about 500 million times using a configuration called deep convolutional generative adversarial networks (DCGAN) included in the generative adversarial network and performing the training processing for less than or equal to 1 hour by a multi-core CPU.

Figure 38:
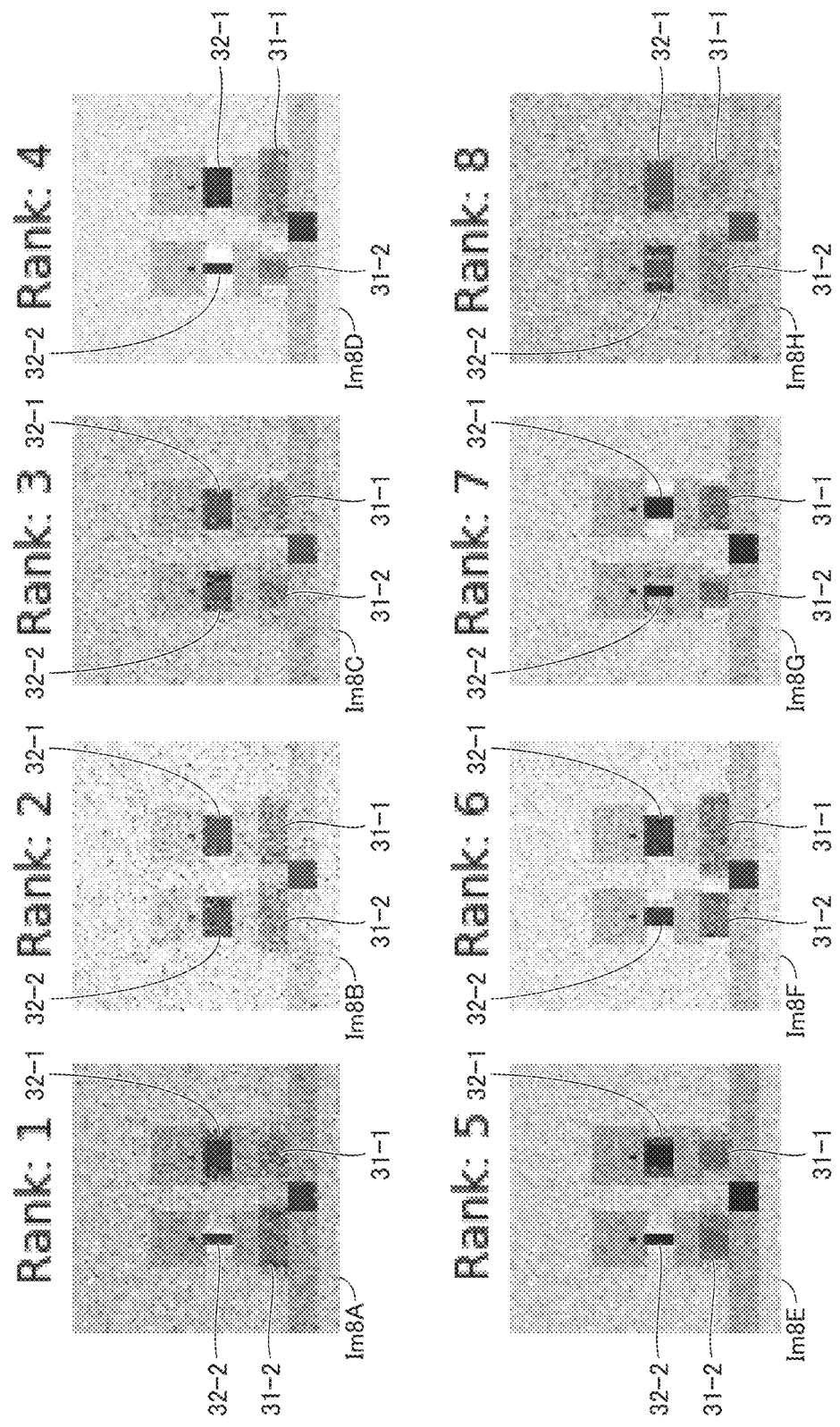
FIG. 38 is a view illustrating another image data of the noise filter generated by the trained image generation model in FIG. 35.

FIG. 38 is a view illustrating other image data Im8A, 8B, 8C, 8D, 8E, 8F, 8G, 8H of noise filter 70 generated by trained image generation model θ2 in FIG. 35. The attenuation amount of noise filter 70 increases in the order of image data Im8A to 8H. Generation of image data Im8A to 8H using trained image generation model θ2 can be completed within 10 seconds by the multi-core CPU.

As illustrated in FIG. 38, it is recognized that the symbol in the image data tends to be larger (line is thicker) as the attenuation amount increases. However, the reason why the attenuation amount is not uniformly increased is that the attenuation amount of noise filter 70 is different due to spatial coupling (electric field coupling or magnetic field coupling) between components. As described above, regarding the numerical data of the object having the nonlinear feature, the numerical data can be expressed as the symbol. In this way, the image data having the numerical data of the feature intended by a user (a designer when the object is a circuit) of the object included in the image data can be generated using trained image generation model θ2. The numerical data corresponding to the symbol can be grasped from the size, the dimension, or the shape of the symbol included in the image data.

In the example of the noise filter, the component constant is used as the parameter. However, when the component ID and the like described in the first embodiment are assigned to the symbol, the configuration generating the image data by the image generation model can be applied not only to the physical phenomena such as heat or vibration but also to a wider field such as inventory management, human traffic line control, or system design.

As described above, according to the information processing device of the eighth embodiment, the reflection of the relevance between the numerical data and the position information in the processing for the image data can be easily implemented by the information processing device that performs the processing.

The embodiments disclosed herein are also planned to be implemented in appropriate combination within a range not contradictory. It should be considered that the disclosed embodiments are an example in all respects and not restrictive. The scope of the present disclosure is defined by not the description above, but the claims, and it is intended that all modifications within the meaning and scope of the claims and their equivalents are included in the present invention.

REFERENCE SIGNS LIST 1, 1A, 1B, 2, 3, 5, 7, 8: information processing device, 9: step-down chopper circuit, 10, 10A: training unit, 20: inference unit, 30: storage unit, 40, 40A: graph generation unit, 50: image update unit, 51: circuitry, 52: memory, 53: storage, 54: input and output unit, 60: dimension reduction unit, 70: noise filter, 80: image generation unit, 90: printed board, 91: power semiconductor, 92: diode, 93: inductor, Ac: air conditioner, Pg1, Pg1A: machine learning program, Pg2: image recognition program, Pg3, Pg7: graph generation program, Pg4: image update program, Pg6: dimension reduction program, Pg8: image generation program, Stm: temperature sensor

The invention claimed is:

1. An information processing device that processes image data representing a distribution of a plurality of numerical data in a specific space, the information processing device comprising: a memory to store an image recognition program; and circuitry configured to extract specific information about the plurality of numerical data from the image data by executing the image recognition program, wherein: each of the plurality of numerical data is a symbol having an appearance different in shape or pattern for each type of the numerical data, and the symbol is disposed in a region, in the specific space, occupied by a target associated with the numerical data in the specific space, a trained image recognition model is further stored in the memory, and the information processing device further includes image update circuitry to update the image data by superimposing noise on the image data such that a loss function that defines a difference between an output of the image recognition model corresponding to the image data and a target value corresponding to the image data is minimized.

2. The information processing device according to claim 1, wherein: the image recognition model includes at least one of an image filter and a neural network, and the circuitry extracts the specific information using the image recognition model.

3. The information processing device according to claim 2, further comprising:
training circuitry to generate the image recognition model from the image data.

4. The information processing device according to claim 1, wherein:
a generation model that generates the image data is further stored in the memory,
the information processing device further comprising graph generation circuitry to generate the image data using the generation model.

5. The information processing device according to claim 4, wherein:
the generation model includes a generative adversarial network.

6. The information processing device according to claim 1, wherein:
the plurality of numerical data is respectively associated with at least one object disposed in the specific space,
a position with which each of the plurality of numerical data is associated in the specific space is a position at which the object associated with the numerical data is disposed in the specific space, and
the appearance corresponds to a size of numerical data corresponding to the symbol, and a type of the object associated with the numerical data.

7. The information processing device according to claim 6, wherein:
the symbol includes a combination of a plurality of dots representing at least one of the size and the type.

8. The information processing device according to claim 6, wherein:
the symbol includes a sub-symbol indicating at least one of the size and an orientation of the symbol.

9. The information processing device according to claim 6, wherein:
the specific space represents a two-dimensional plane on a printed board on which at least one circuit component is implemented, and
the symbol corresponds to any one of the at least one circuit component.

10. The information processing device according to claim 6, wherein:
the specific space represents a three-dimensional space in which at least one sensor is arranged, and
the symbol corresponds to any one of the at least one sensor.

11. The information processing device according to claim 1, wherein:
each of the plurality of numerical data includes at least one parameter, and
the image data includes a graph having at least one coordinate axis respectively corresponding to each of the at least one parameter.

12. The information processing device according to claim 11, further comprising:
graph generation circuitry to generate the graph from the plurality of numerical data.

13. The information processing device according to claim 12, wherein:
the graph includes a scatter diagram having at least two dimensions.

14. The information processing device according to claim 11, wherein:
the plurality of numerical data includes a first parameter and a second parameter,
a graph generated from the numerical data includes a first scatter diagram representing a relationship between the first parameter and the second parameter, and
the circuitry
extracts a first envelope and a second envelope from the first scatter diagram, the first envelope being parallel to the second envelope, and
derives a first relational expression between the first parameter and the second parameter from inclinations of the first envelope and the second envelope, the first relational expression representing the first parameter.

15. The information processing device according to claim 11, wherein:
the at least one parameter includes an objective variable, and
the information processing device further comprises dimension reduction circuitry to perform dimension reduction of the at least one parameter using ranking of importance of the at least one parameter with respect to the objective variable.

16. The information processing device according to claim 11, wherein:
the at least one parameter includes a parameter regarding a simulation condition, a parameter regarding an observation condition of an experiment, or a hyperparameter of machine learning.

17. The information processing device according to claim 1, wherein: the plurality of numerical data includes an objective variable, the image update circuitry updates the image data by friendly attack, and the circuitry extracts the objective variable using the image recognition model from the image data updated by the friendly attack.

18. The information processing device according to claim 17, wherein:
the image recognition model is generated by transfer learning in which image data designated for each user is used as training data.

19. The information processing device according to claim 1, wherein:
for the numerical data of a same type, one of polygons including triangle and quadrangle and shapes other than polygons is selected and defined as the symbol, the shapes including circle and ellipse, and
the symbol is disposed, in the specific space, at a coordinate of center of gravity of a region occupied by the numerical data, or a coordinate of any point in a region occupied by the numerical data.

* * * * *